(12) United States Patent
Haba et al.

(10) Patent No.: US 10,734,759 B2
(45) Date of Patent: Aug. 4, 2020

(54) CONFIGURABLE SMART OBJECT SYSTEM WITH MAGNETIC CONTACTS AND MAGNETIC ASSEMBLY

(71) Applicant: Xcelsis Corporation, San Jose, CA (US)

(72) Inventors: Belgacem Haba, Saratoga, CA (US); Ilyas Mohammed, Santa Clara, CA (US); Gabriel Z. Guevara, Gilroy, CA (US); Min Tao, San Jose, CA (US)

(73) Assignee: Xcelsis Corporation, San Jose, CA (US)

( * ) Notice: Subject to any disclaimer, the term of this patent is extended or adjusted under 35 U.S.C. 154(b) by 0 days.

(21) Appl. No.: 16/295,251

(22) Filed: Mar. 7, 2019

(65) Prior Publication Data
US 2019/0280428 A1 Sep. 12, 2019

Related U.S. Application Data

(60) Provisional application No. 62/639,861, filed on Mar. 7, 2018.

(51) Int. Cl.
*H01R 13/62* (2006.01)
*H01R 24/84* (2011.01)
(Continued)

(52) U.S. Cl.
CPC ......... *H01R 13/6205* (2013.01); *G06N 20/00* (2019.01); *H01R 12/71* (2013.01);
(Continued)

(58) Field of Classification Search
CPC .. H01R 13/6205; H01R 12/71; H01R 43/205; H01R 2013/00
(Continued)

(56) References Cited

U.S. PATENT DOCUMENTS 9,019,718 B2 * 4/2015 Bdeir ................. H01R 13/6205
9,592,443 B2 * 3/2017 Villar .................... A63F 13/235
(Continued)

OTHER PUBLICATIONS

Teig, Steven L., Haba, Belgacem, and Mohammed, Ilyas: U.S. Appl. No. 62/365,253, filed Jul. 21, 2016 entitled "Machine Learning Apparatuses, Systems, Assemblies and Methods."
(Continued)

*Primary Examiner* — Harshad C Patel
(74) *Attorney, Agent, or Firm* — Lee & Hayes, PC

(57) ABSTRACT

Configurable smart object systems with magnetic contacts and magnetic assembly are provided. Example systems implement machine learning based on neural networks that draw low power for use in smart phones, watches, drones, automobiles, and medical devices, for example. Example assemblies can be configured from pluggable, interchangeable modules that have compatible ports with magnetic electrical contacts for interconnecting and integrating functionally dissimilar sensor systems. The magnetic electrical contacts physically couple the interfaces together or to a motherboard socket while providing an electrical coupling across the coupled magnetic contacts. The magnetic electrical contacts may arrayed in a reversible configuration so that a module or plug connection is reversible. A controller may dynamically assign power, ground, and data channels to the magnetic electrical contacts on the fly as the system is configured or reconfigured. The controller may also extend a network across the modules connected through the magnetic electrical contacts and modify the network as the magnetic electrical contacts are attached, detached, and reattached.

20 Claims, 25 Drawing Sheets

(51) Int. Cl.
*H01R 43/20* (2006.01)
*G06N 20/00* (2019.01)
*H01R 12/71* (2011.01)
*H01R 103/00* (2006.01)

(52) U.S. Cl.
CPC ............ *H01R 24/84* (2013.01); *H01R 43/205* (2013.01); *H01R 2103/00* (2013.01)

(58) Field of Classification Search
USPC .......................................................... 439/39
See application file for complete search history.

(56) References Cited

U.S. PATENT DOCUMENTS

| | | | | |
|---|---|---|---|---|
| 9,597,607 | B2* | 3/2017 | Bdeir | H01R 13/6205 |
| 9,647,385 | B2* | 5/2017 | Suh | H01R 13/6205 |
| 2006/0134978 | A1* | 6/2006 | Rosen | A63H 33/042 |
| | | | | 439/581 |
| 2007/0173095 | A1* | 7/2007 | Bin-Nun | A63H 33/108 |
| | | | | 439/219 |
| 2010/0095035 | A1* | 4/2010 | Chen | H05B 37/0254 |
| | | | | 710/110 |
| 2010/0216548 | A1* | 8/2010 | Ellis | G06N 3/004 |
| | | | | 463/31 |
| 2011/0106996 | A1* | 5/2011 | Rosso | G06F 13/409 |
| | | | | 710/300 |
| 2012/0122059 | A1* | 5/2012 | Schweikardt | A63H 33/04 |
| | | | | 434/118 |
| 2012/0218211 | A1* | 8/2012 | McRae | G06F 1/1656 |
| | | | | 345/173 |
| 2013/0050958 | A1* | 2/2013 | Bdeir | H01R 13/6205 |
| | | | | 361/730 |
| 2013/0109267 | A1* | 5/2013 | Schweikardt | A63H 33/04 |
| | | | | 446/85 |
| 2013/0234390 | A1* | 9/2013 | Pabon | A63F 3/02 |
| | | | | 273/288 |
| 2013/0343025 | A1* | 12/2013 | Bdeir | H01R 13/6205 |
| | | | | 361/803 |
| 2014/0308872 | A1* | 10/2014 | Petillo | A63H 33/088 |
| | | | | 446/127 |
| 2015/0093922 | A1* | 4/2015 | Bosscher | H01R 13/665 |
| | | | | 439/39 |
| 2015/0251104 | A1* | 9/2015 | Lange | A63H 33/042 |
| | | | | 446/92 |
| 2016/0101370 | A1* | 4/2016 | Madsen | A63H 33/042 |
| | | | | 446/91 |
| 2016/0219740 | A1* | 7/2016 | Gehrke | H01H 27/00 |
| 2017/0220515 | A1* | 8/2017 | Lin | G06F 1/3287 |
| 2017/0282091 | A1* | 10/2017 | Wang | H04L 9/0816 |
| 2018/0025268 | A1* | 1/2018 | Teig | G06N 3/063 |
| | | | | 706/25 |

OTHER PUBLICATIONS

Teig, Steven L., U.S. Appl. No. 15/224,632, filed Jul. 31, 2016 entitled "Mitigating Overfitting in Training Machine Trained Networks".

Teig, Steven L., U.S. Appl. No. 15/231,787, filed Aug. 9, 2016 entitled "Machine Learning Through Multiple Layers of Novel Machine Trained Processing Nodes".

Teig, Steven L., U.S. Appl. No. 15/231,789, filed Aug. 9, 2016 entitled "Machine Learning Through Multiple Layers of Novel Machine Trained Processing Nodes".

* cited by examiner

CONFIGURABLE SMART OBJECT SYSTEM WITH MAGNETIC CONTACTS AND MAGNETIC ASSEMBLY

CROSS-REFERENCE TO RELATED APPLICATIONS

This application claims the benefit of U.S. Provisional Patent Application No. 62/639,861, filed Mar. 7, 2018, which is incorporated by reference herein in its entirety.

BACKGROUND

There has been increasing interest in applying machine learning applications to more tasks. This increase has been fueled by an increase in the availability of inexpensive computing power, providing deep learning applications that use many layers of processing nodes at low computational cost. Conventionally, such deep learning processes require enormous computational resources, and so are absent from the everyday appliances, vehicles, and portable personal devices in the everyday world of daily living that is far removed from enterprise computers and large server facilities, and where everyday devices have only relatively limited computational resources.

SUMMARY

A configurable smart object system with magnetic contacts and magnetic assembly. Configurable machine learning assemblies for autonomous operation in personal devices, appliances, vehicles, and also in large machines and factories are described. Example systems implement machine learning elements, based on neural networks for example, that draw low electrical power for use in smart phones, watches, drones, appliances, automobiles, and medical devices, for example. The example machine learning systems may also be used in large system applications, such as HVAC, traffic control, factories, and financial institutions, for example.

The example machine learning assemblies can be made small, for use aboard a smart phone or appliance, for example, but do not have to be small. The smart object system, although portable, can include significant machine learning capability, and is highly configurable, not only with respect to programming, but also with respect to manual configuration of physical modules making up configurable assemblies for various applications, with various sensors, for example. An example smart object system can be designed into a new OEM product, or can be retrofitted to some existing devices.

In an implementation, once aboard a hosting device or appliance, the smart object system can be modified and reconfigured if needed. Detachable and reattachable modules of the system can be swapped out or upgraded, or sensors changed from one kind to another. A product designer may design a particular assemblage of the modules to build a unique custom configuration of the smart object system, suitable for inclusion in a particular product and for large-scale manufacture of the product being designed.

Configurable smart object systems with magnetic contacts and magnetic assembly are provided. Example systems implement machine learning based on neural networks that draw low power for use in smart phones, watches, drones, automobiles, and medical devices, for example.

Example assemblies can be configured from pluggable, interchangeable modules that have compatible ports with magnetic electrical contacts for interconnecting and integrating functionally dissimilar sensor systems. The magnetic electrical contacts physically couple the interfaces together or to a motherboard socket while providing an electrical coupling across the coupled magnetic contacts. The magnetic electrical contacts may arrayed in a reversible configuration so that a module or plug connection is reversible. A controller may dynamically assign power, ground, and data channels to the magnetic electrical contacts on the fly as the system is configured or reconfigured. The controller may also extend a network across the modules connected through the magnetic electrical contacts and modify the network as the magnetic electrical contacts are attached, detached, and reattached.

This summary is not intended to identify key or essential features of the claimed subject matter, nor is it intended to be used as an aid in limiting the scope of the claimed subject matter.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein.

FIG. 1 is a block diagram of an example machine learning assembly.

FIG. 2 is a block diagram of an example machine learning assembly with various different modules.

FIG. 3 is a block diagram of example configurations for combining multiple core modules of an example machine learning assembly.

FIG. 4 is a block diagram of an example machine learning assembly with an expanded neural network made by interconnected core modules.

FIG. 5 is a block diagram of an example machine learning core of an example machine learning assembly.

FIG. 6 is a block diagram of the example machine learning core of FIG. 5, in greater detail.

FIG. 7 is a diagram of an example housing for a module of a machine learning assembly, and an example pinout of a port on the module.

FIG. 8 is a diagram of another example housing for a module of a machine learning assembly, with multiple ports on a side.

FIG. 9 is an inside-view diagram of an example core module with an example machine learning core.

FIG. 10 is a bottom-view diagram of the example core module of FIG. 9.

FIG. 11 is a diagram of an example interconnection module with ports on two opposing sides.

FIG. 12 is a diagram of an example interconnection module with ports on two adjacent sides.

FIG. 13 is a diagram of an example interconnection module with ports on three adjacent sides.

FIG. 14 is a diagram of interconnected modules constituting an example machine learning assembly.

FIG. 15 is a diagram of example modules suitable for stacking to make an example stacked machine learning assembly, without discrete interconnection modules or adapters.

FIG. 16 is a diagram of an example stacked machine learning assembly, using the example modules of FIG. 15.

FIG. 17 is a block diagram of example machine learning system functionalities.

FIG. 18 is a flow diagram of an example method of autonomously operating a configurable machine learning assembly in a portable personal device.

FIG. 19 is a diagram of an example configurable smart object system with magnetic electrical contacts and magnetic assembly.

FIG. 20 is a diagram of an example configurable smart object system with magnetic electrical contacts and 3D magnetic assembly.

FIG. 21 is a diagram of an example configurable smart object system with magnetic electrical contacts and vertical stack magnetic assembly.

FIG. 22 is a flow diagram of an example method of constructing a configurable smart object system with magnetic electrical contacts.

FIG. 23 is a flow diagram of an example method of constructing a configurable smart object system and dynamically assigning power, ground, and data channels to magnetic electrical contacts of modules of the smart object system.

FIG. 24 is a flow diagram of an example method of constructing a configurable smart object system and dynamically extending a control network or a communication network across modules of the smart object system via magnetic electrical contacts of the modules.

FIG. 25 is a flow diagram of an example method of securing a configurable smart object to a motherboard via magnets and making electrical contacts between the smart object system and the motherboard via the magnets.

DETAILED DESCRIPTION

Overview

Figure 1:
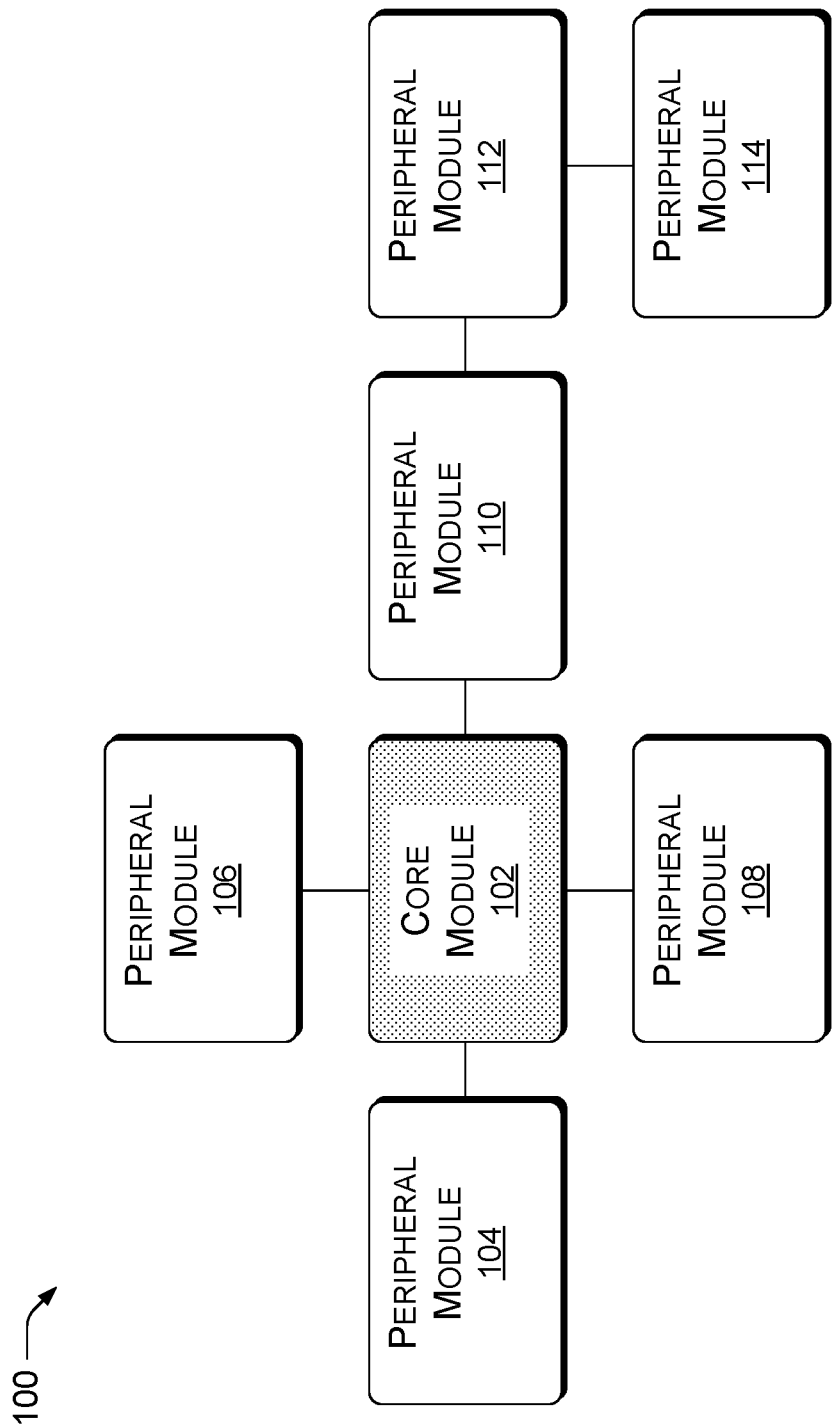
FIGS. 1-18 describe an example machine learning assembly based on neural networks for example, as depicted in patent references cited below and incorporated by reference herein.

This disclosure describes configurable smart object systems with magnetic contacts and magnetic assembly. Example systems, devices, and methods implement machine learning functions and "smart object" devices that are based on artificial neural networks that draw only low electrical power. The low power requirements enable the configurable machine learning assemblies to be used onboard smart phones, watches, drones, automobiles, medical devices, and other small personal devices, appliances, and vehicles. Machine learning assemblies onboard a mobile device or vehicle can be powered by batteries, for example, and once onboard a small personal device, can self-learn to provide smart functions, such as recognizing faces and visual objects in images or a live camera feed. The smart object system can also perform autonomous decision-making, which can be actualized in steering a vehicle or authorizing/logging-in a user, for example. The smart object system does not have to be small, but can also be applied to large systems, large machines, houses and buildings, for example. The smart machine learning assemblies described herein can provide these smart functions without needing to access powerful outside computing resources. Moreover, the smart learning assemblies can keep onboard data private, performing autonomously.

Example methods for making physical modules of the configurable smart object system, for containing the electronics of the smart object system, and for creating electrical and physical interfaces for connecting the modules with each other, and with external devices, are described herein. The example physical modules also include contactors, for making power and data connections between modules with module-to-module interfaces, and for interfacing a module or the entire smart object system with a motherboard, device, or appliance.

Example Physical Module Methods and Apparatuses

The example machine learning assemblies can be made small. Versions of an example machine learning assembly may draw less than one watt of electric power on average, suitable for personal and mobile devices, medical devices, smart tools, instruments, and vehicles, for example.

An example system couples or integrates one or more sensor-based systems with a machine learning system, in a pluggable, configurable, and self-discoverable machine learning assembly. An example machine learning assembly can use complementary connectors or common identical interfaces with compatible pinouts to couple multiple functional systems that may be functionally dissimilar, such as diverse sensor systems, by coupling multiple respective modules to form an integrated configurable system with a machine learning core.

An example core module of the system contains a machine learning kernel, and multiple cores can be connected together to expand the neural network. An example machine learning assembly auto-detects connected sensors and peripherals, and extends a network or bus to all connected components.

Example Systems

The example configurable smart object system with magnetic contacts and magnetic assembly described herein can be used with many kinds of machine learning electronics, including those based on neural networks. A non-limiting example machine learning assembly based on neural networks, for example, is described in U.S. patent application Ser. No. 15/396,267 to Teig, filed Dec. 30, 2016, which claims priority to U.S. Provisional Patent Application No. 62/365,253 to Teig, filed Jul. 21, 2016, both of these incorporated by reference herein in their entireties.

FIGS. 1-18 show an example machine learning assembly based on neural networks that uses modules as building blocks, as described in the above patent references incorporated by reference.

FIGS. 19-25 describe the example smart object system with methods of making modules and their contactors.

FIG. 1 shows an example machine learning assembly 100. In an implementation, the example machine learning assembly 100 can be configured from pluggable, interchangeable modules that may each have at least one compatible port for interconnecting with each other. A "core" module 102 contains at least one machine learning kernel embodied in a neural network, and multiple core modules 102 can be coupled together in series, in parallel, or as a cluster to expand the neural network. Peripheral modules 104, 106, 108, 110, 112 & 114 are attachable to the core module 102, or to each other, but all peripheral modules can be in communication with at least one core module 102.

Figure 2:
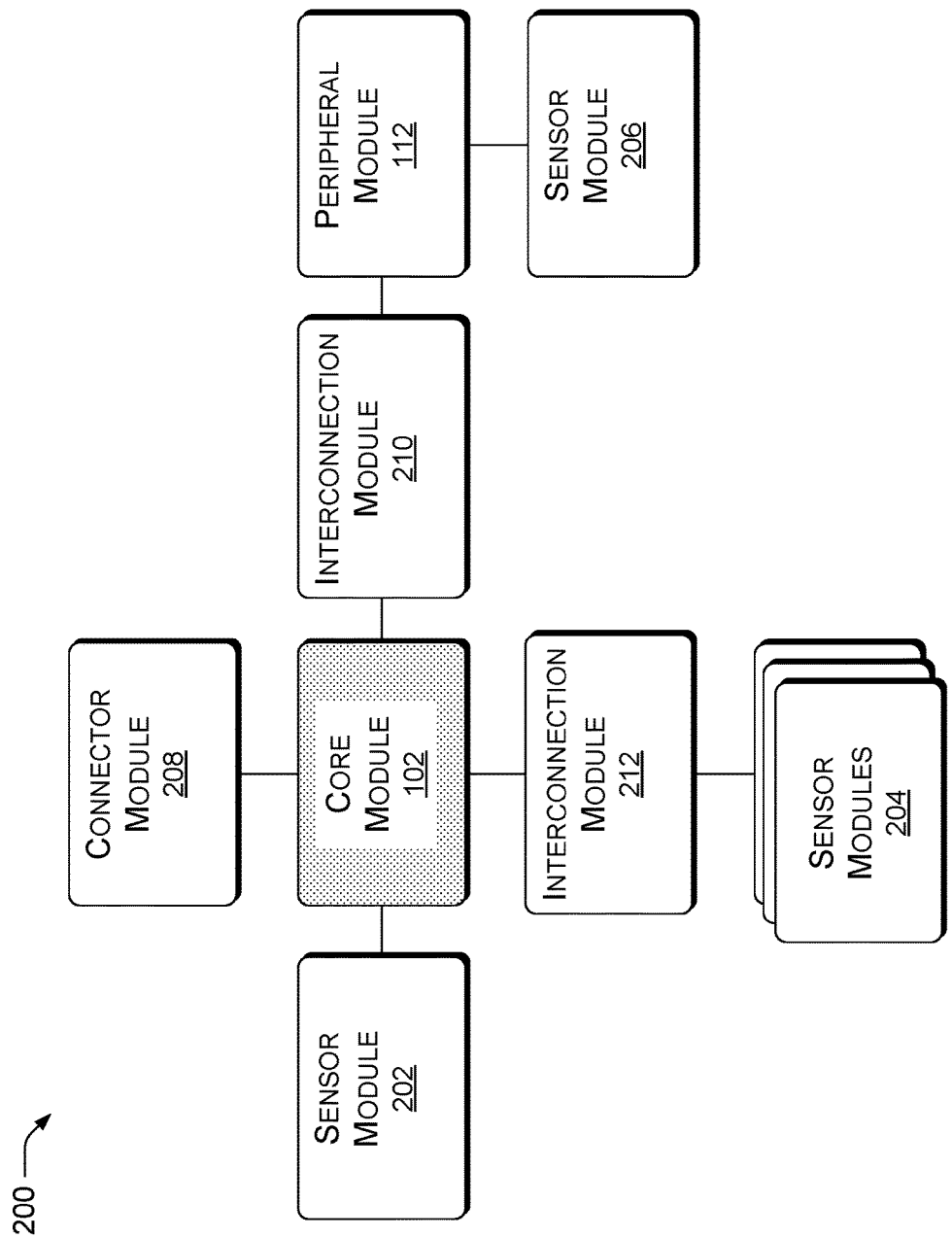

FIG. 2 shows another example machine learning assembly 200 ("system" 200). Various types of peripheral modules 112 can be joined to the example machine learning assembly 200 and brought into communication with the core module 102, such as sensor modules 202, 204 & 206, a connector module 208 for interfacing with a motherboard of a hosting device, for example, interconnection (adapter) modules 210 & 212, wireless transmitter modules (not shown), and other modules with other functions. The peripheral modules 112 or sensor modules 202 may be attachable systems or subsystems, such as an infrared (IR) system, an imaging system, a health system, an activity system, an environment system, and a location & orientation system, for example. These systems may include respective sensors and software. The interconnection modules 210 & 212 can intervene between other modules to adapt the modules to each other, both physically and electrically, and facilitate complex or extensive configurations of the overall assembly 200. In an implementation, the interconnection modules 210 may include analog-to-digital converters to render analog output of the sensor modules 202, 204 & 206, into digital signals for processing at the core module 102.

In an implementation, the example machine learning assembly 200 has a dynamic "nervous system" that auto-detects sensors and peripherals, and dynamically extends a communication, control, and sensor network or a common bus, across all connected components in a given machine learning assembly 200.

Figure 3:
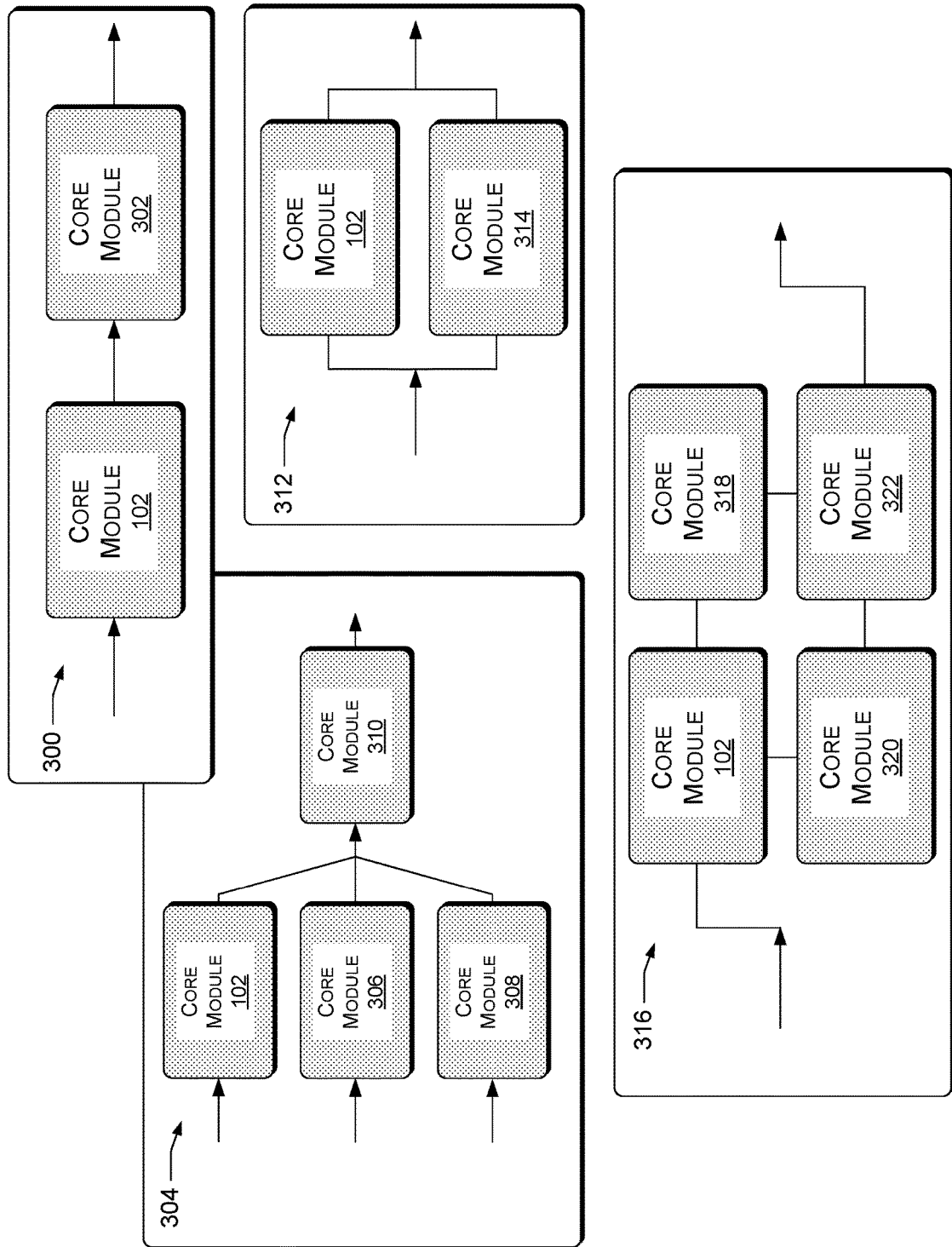

FIG. 3 shows example core module configurations 300, 304, 312 & 316 for an example machine learning assembly 200. The dynamic nervous system of the example machine learning assembly 200, capable of auto-detecting sensor modules 202 and peripheral modules 112, can be based in a single core module 102 or in a grouping 300, 304, 312 or 316 of core modules 102. Besides dynamically extending a communication, control, and/or sensor network or a common bus across all connected components in a given machine learning assembly 200, the dynamic nervous system also tracks and manages the interconnection and configuration of multiple core modules when they are connected together as a group 300, 304, 312 or 316.

In one configuration 300, core modules 102 & 302, which contain at least one machine learning kernel apiece, can be connected in a series configuration 300. The output of the first neural network hosted by the first core module 102 becomes input for a second neural network hosted by the second core module 302. In this series configuration 300, the output of the first core module 102 may be a simple, conclusory result containing little data, such as a binary "yes/no" decision generated by the neural network of the first core module 102.

In a tree configuration 304, multiple core modules 102, 306, 308 & 310 are interconnected such that multiple core modules 102, 306 & 308 provide input for a single subsequent core module 310, creating a simple network of neural networks 508.

In a parallel processing configuration 312, a single source of input is sent to two or more core modules 102 & 314 connected in parallel. The multiple core modules 102 & 314 connected in parallel 312 may process the same input but apply different parameters within their respective neural networks, such as processing with different priors or with different node thresholds or different weighting schemes for the data or sensor input. The conclusions (outputs) of the paralleled core modules 102 & 314 are then compared or combined into a single final output. In another arrangement of the parallel configuration 312, the multiple core modules 102 & 314 more cleanly split a task. In yet another example scheme, the paralleled core modules 102 & 314 are connected redundantly, for checking each other's output, i.e., for component failure, or to give confidence to results.

In a cluster configuration 316, multiple core modules 102, 318, 320 & 322 are interconnected to make a single expanded neural network. At least one of the core modules 102 has a component that is used to configure and manage the arrangement of the core modules 102, 318, 320 & 322, in one of many possible cluster configurations 316.

Figure 4:
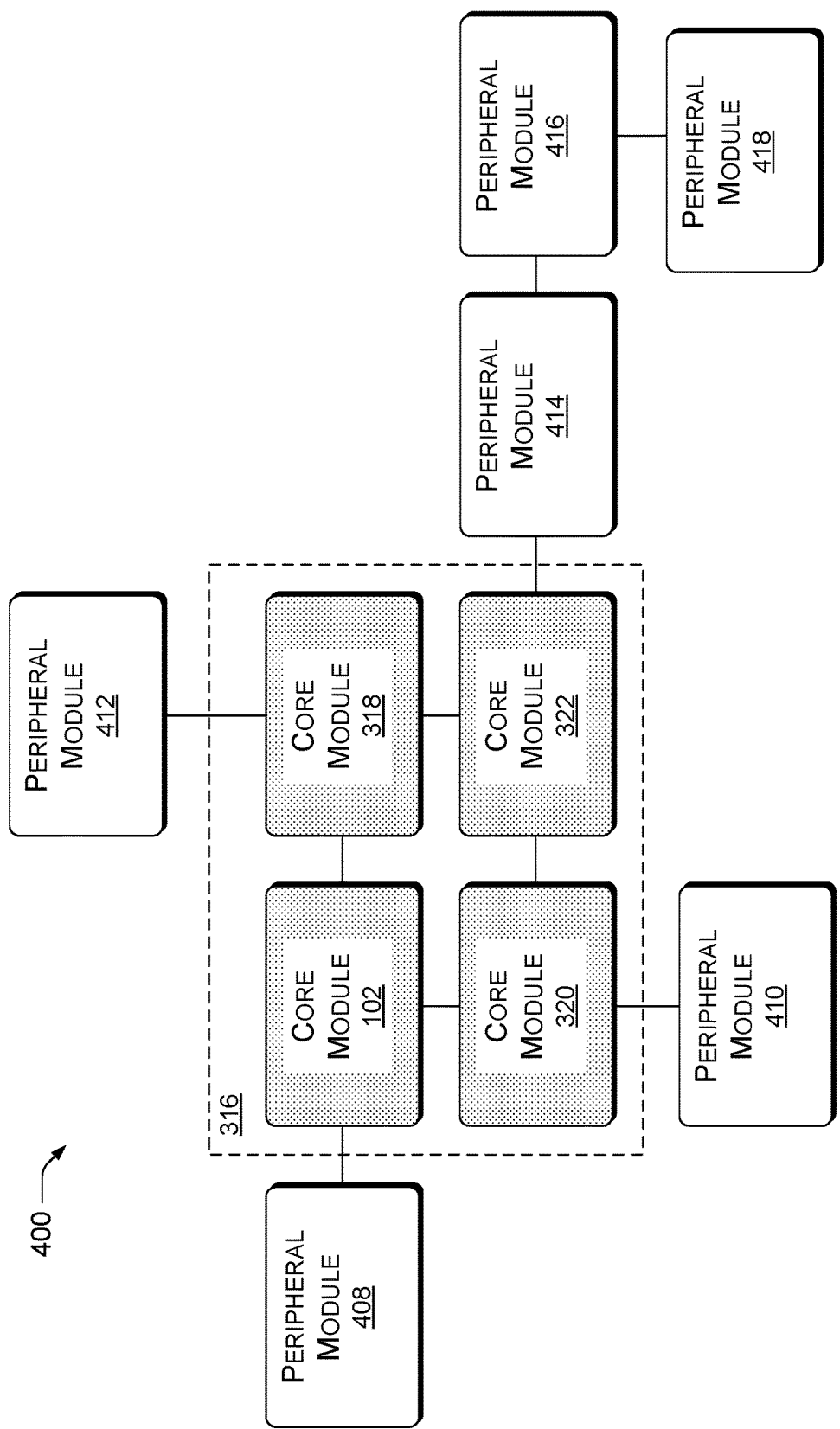

FIG. 4 shows an example machine learning assembly 400 with a cluster configuration 316 of the core modules 102, 318, 320 & 322. FIG. 4 shows an example configuration of peripheral modules 408, 410, 412, 414, 416 & 418, connected to a cluster configuration 316 of the core modules.

Figure 5:
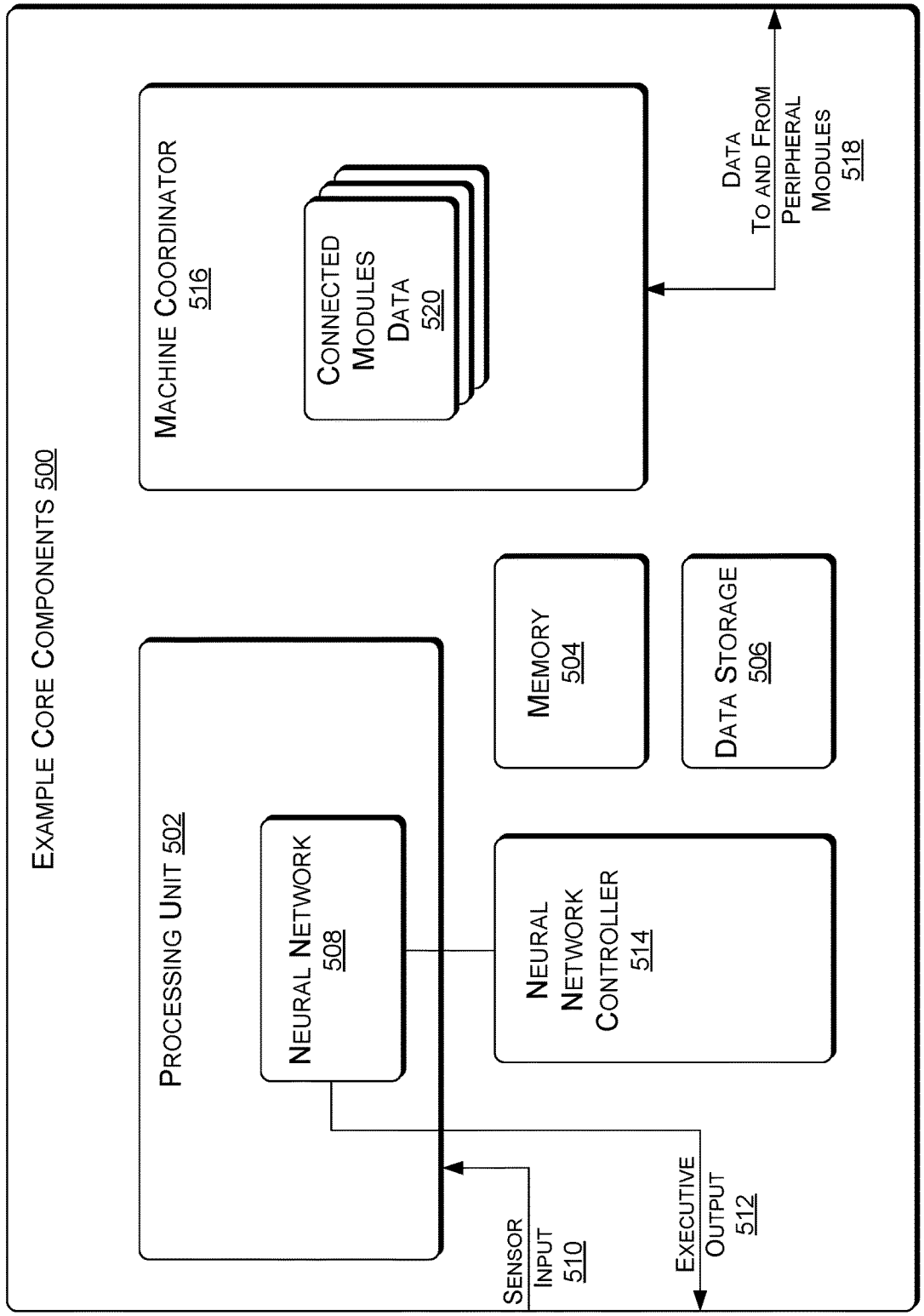

FIG. 5 shows example core components 500 of the example core module 102 of FIGS. 1-3, in greater detail. FIG. 5 shows only one example of core components 500 for the sake of description. Many other configurations of example core components 500 are also possible. In an implementation, the example core components 500 are implemented mostly or completely in hardware, such as application-specific integrated circuits (ASICs) and similar packages.

In an implementation, the example core components 500 include at least one processing unit 502, a memory 504, and data storage 506, for example. A neural network 508 resides in, or is associated with at least a component of the processing unit 502. The processing unit 502 receives input data 510 from sensors either directly or indirectly, and/or receives other data input. Significantly, in an implementation, all the raw data 510 input from sensors to a core 102 remains within the system 200. For control and security, if any raw digital data or raw analog data is selected to leave the system 200, the data being released is only released from the processing unit 502, and the decision to release the data is reserved to the processing unit 502. The outgoing executive output 512 is generally an indicator, decision, or control directive generated by the neural network 508 that also remains within the device or machine hosting the example machine learning assembly 200, and is not raw data 510 incoming from sensors.

The neural network 508 processes the input data 510 via one or more machine learning functions or other artificial neural network techniques, and produces executive output data 512 or an executive output signal 512. The executive output 512 may consist of very little data, such as a simple decision or single directive, compared with the input data 510, which can be any amount of data. In an implementation, the core components 500 do not store all of the data generated by sensors or generated as input data 510, but can use the input data 510 to generate executive output 512 via the neural network 508, and then can delete or forego saving the input data 510. Regardless, the input data 510 from sensors does not leave the machine learning assembly 200 unless such a data export is explicitly configured to occur under permission from the processing unit 502.

A neural network controller 514 in the core 500 can configure the neural network 508, including, in one implementation, controlling multiple machine learning kernels and cores components 500 in the same core module 102. The example neural network controller 514 can configure the neural network 508 for autonomously performing visual object recognition and decision-making in small personal devices based on functions and algorithms that can be scaled to accomplish complex tasks while at the same time achieving low power consumption levels that make mobile and remote implementations feasible.

A machine coordinator 516 in the core 500 configures and maintains the overall machine learning assembly 200. The machine coordinator 516 may embody the dynamic nervous system introduced above that auto-detects sensor modules 202 and various peripheral modules 112, and dynamically extends a communication, control, and/or sensor network or a common bus across all connected components in a given machine learning assembly 200. The machine coordinator 516 may store currently connected modules data 520, such as the statuses and various operational and connectivity parameters of each module connected to the example machine learning assembly 200. Via an onboard network or bus, the machine coordinator 516 coordinates communication, control, and sensor data to and from peripheral modules 518 connected to the core module 102.

Figure 6:
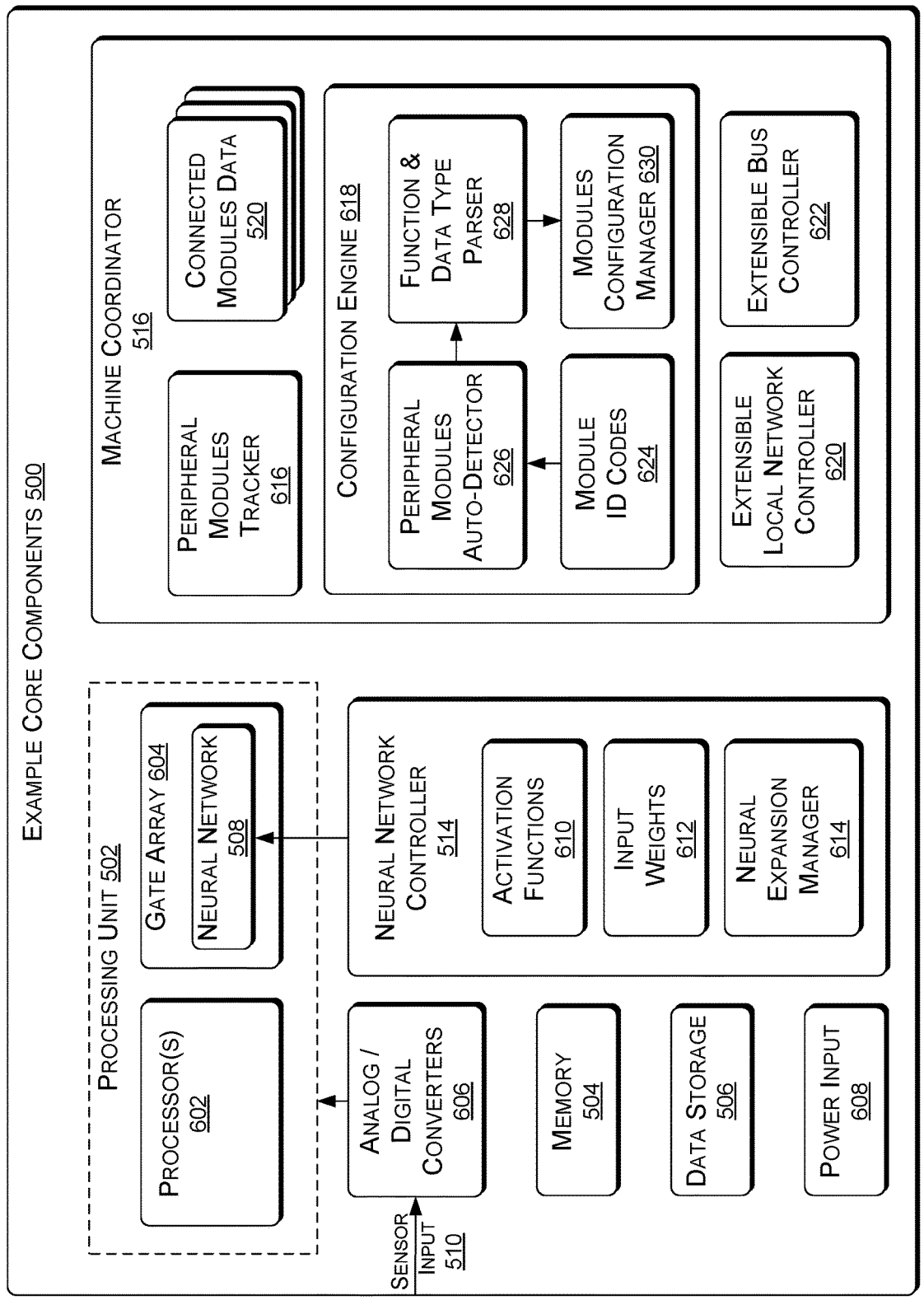

FIG. 6 shows the example core components 500 of FIG. 5 in greater detail. FIG. 6 represents only one example embodiment of the core components 500 for the sake of description. Many other configurations of example core components 500 are also possible. In an implementation, the example core components 500 are implemented mostly or completely in hardware, such as application specific integrated circuits (ASICs) and the like.

In an implementation, example core components 500 include one or more computing processors 602 in the processing unit 502, and/or one or more gate arrays 604, such as one or more field programmable gate array devices 604. A neural network 508 is shown as configured in the gate array 604, but can also be implemented as program instructions in the one or more computing processors 602.

The example core components 500 may include discrete analog-to-digital converters 606 to render analog sensor input 510 into digital signals for the processing unit 502. The example core 500 may also have a power input 608, such as connection to battery power or connection to power from a hosting device, or the example core components 500 may include the batteries themselves.

The neural network controller 514 may implement one or more power-efficient neural networks 508 by applying activation functions 610 and weightings 612 of input data 612 for specific nodes of the neural network 508 being implemented. Examples of neural networks 508 that draw low electrical power and thereby enable the small, autonomous, and portable machine learning assemblies 200 are described further below. The neural network controller 514 may also include a neural expansion manager 614, which manages interconnected core modules 102, as shown in FIGS. 3 & 4.

Besides maintaining a database or a storage of connected modules data 520, the machine coordinator 516 of the example core components 500 may also include a peripheral modules tracker 616, a configuration engine 618, an extensible local network controller 620, and an extensible bus controller 622, for example.

The example configuration engine 618 may store module identification (ID) codes, for identifying various different pluggable modules that may become connected to the example machine learning assembly 200. An auto-detector 626 receives an ID code 624 from a newly connected peripheral module 112, and communicatively adds or logs on the newly connected peripheral module 112 to the machine learning assembly 200, via the onboard network or bus. The extensible local network controller 620 and/or the extensible bus controller 622 may implement connection to the local onboard bus or network via physical ports and connectors between modules that have conductive electrical connectors, or may implement wireless connections between modules, by Wi-Fi, Bluetooth, ZigBee, or infrared, for example. Once a peripheral module 112 is communicatively added and/or logged on to the example machine learning assembly 200, a function-and-data-type parser 628 establishes the identity and purpose of the peripheral module 112, as well as compatible communication with the added peripheral module 112. A configuration manager 630 may outfit the newly added peripheral module 112 with compatibility parameters or desired settings, and normalize a communication protocol between the core module 102 and each connected peripheral module 112 or sensor module 202.

Example Apparatuses

In an implementation, components of the example machine learning assemblies 200 may be embodied in discrete housing packages of a modular smart object system.

Figure 7:
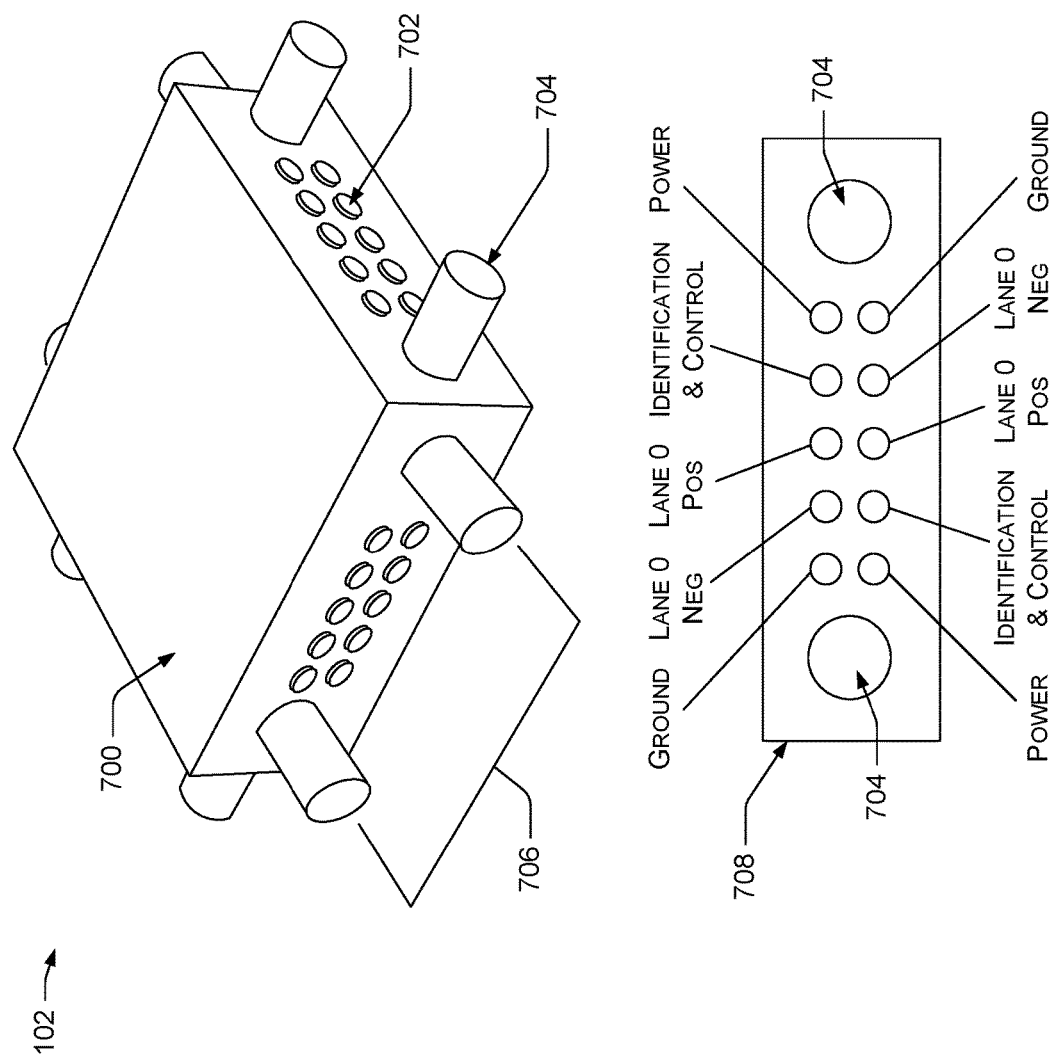

FIG. 7 shows a first example implementation of a housing 700 for a module 102 or component of the machine learning assembly 200, such as an example housing 700 of a core module 102, a sensor module 202, or other component. The housing 700 may include electrical contacts 702 for forming electrical connections with other components, including additional machine learning core modules 102, with electrical interconnection components 210, with sensor modules 202, or with other electrical or electronic components. The example housing 700 may also include one or more physical connection features 704, which may assist in orienting, aligning, and physically coupling the example housing 700 to another compatible component or housing. In an implementation, the electrical contacts 702 and physical connection features 704 combine to form a single purposed port 706.

The example housing 700 may be constructed using well-established electronics packaging techniques. In certain implementations, portions or the entirety of the example housing 700 may be printing using a 3D printer.

An example pinout 708 of the example port 706 may have symmetrical features, so that each port 706 and its resulting connection with other complementary modules and connectors is reversible: the modules and connectors can be mated in either direction. In an implementation, the various modules possible in a machine learning assembly 200 all use identical interfaces with identical or complementary pinouts and the same pin functionalities. In an example implementation, Pin 1 is Ground (GND), pin 2 is lane 0 negative, pin 3 is lane 0 positive, pin 4 is identification or control, and pin 5 is power (PWR). In an implementation, a second or opposing row of pins is in reverse order, providing a reversible pluggable port 706. Many other pinouts 708 of the example port 706 are possible, including different pin counts in different configurations with different and additional electrical connections to the pins. However, for a given implementation of the example machine learning assembly 200, the interfaces between modules can be identical among the modules in that assembly.

Figure 8:
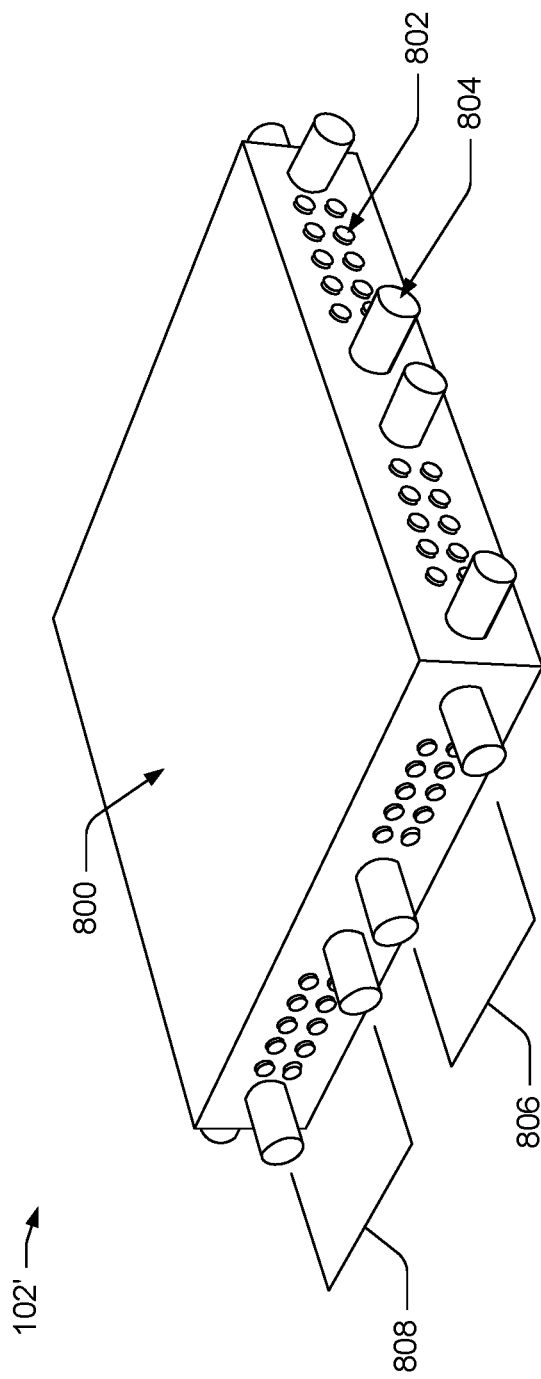

FIG. 8 shows a second example implementation of a housing 800 for a module of a machine learning assembly, such as an example housing of a core module 102', a sensor module 202, or other component. The example housing 800 may have multiple sets of electrical connections 802 and connection features 804 on a given side, providing multiple ports 806 & 808 for a given connection, to mate with a given connector.

Figure 9:
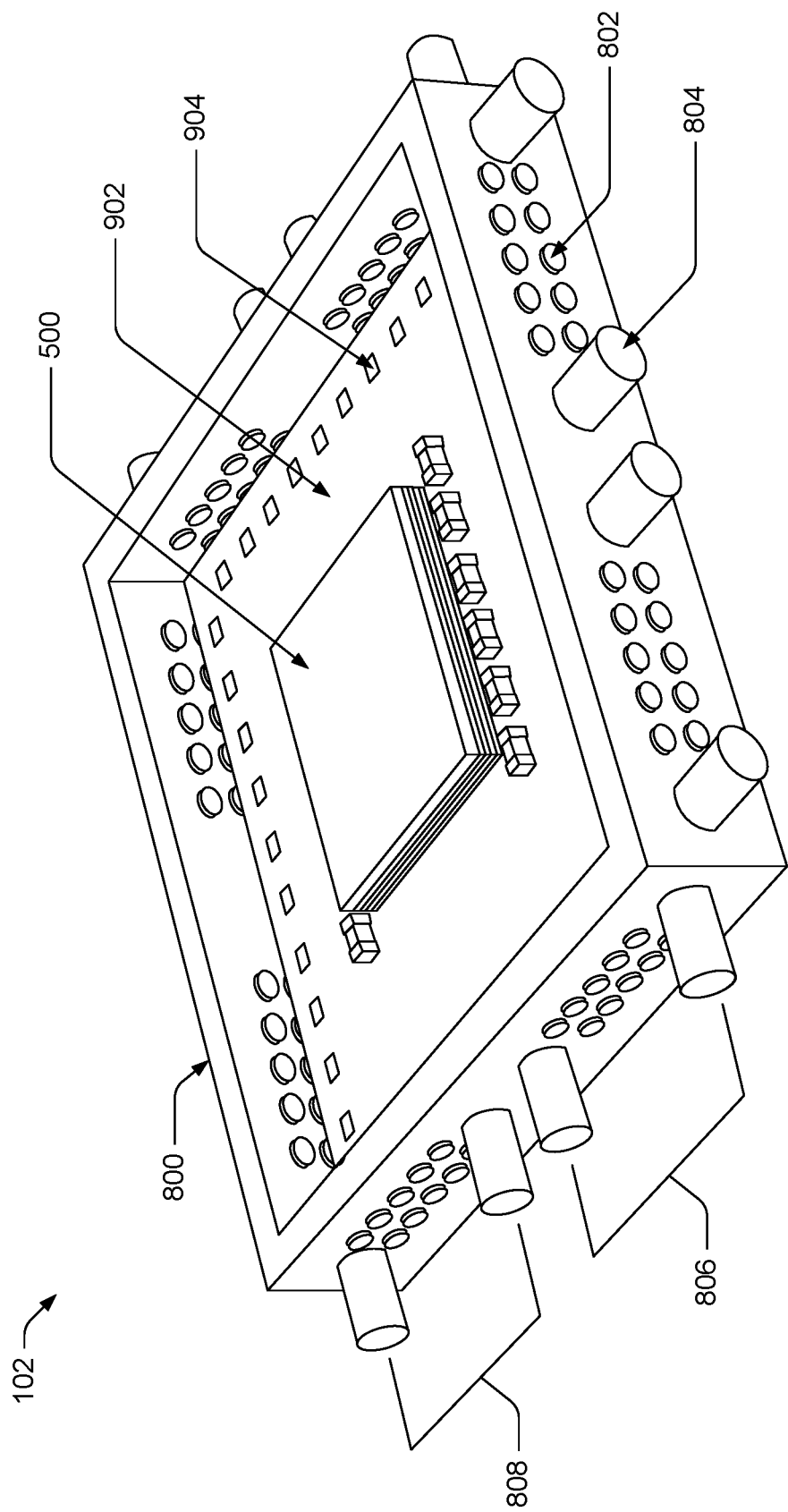
Figure 10:
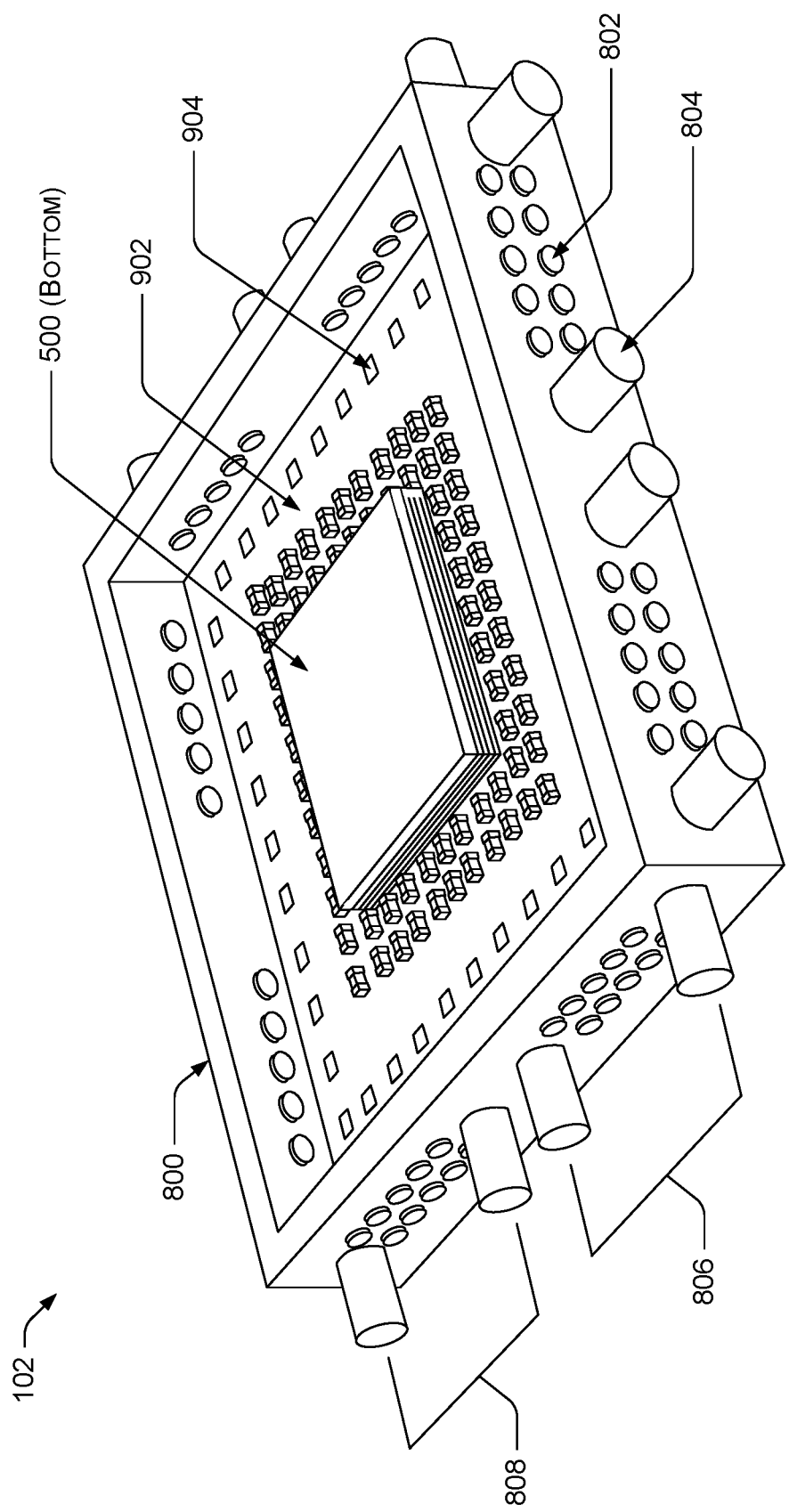

FIG. 9 shows an inside view of an example machine learning core module 102 and example housing 800. Likewise, FIG. 10 shows an inside bottom view of the same core module 102 of FIG. 9. In an implementation, the example housing 800 encloses or encapsulates the example core components 500, including electronics and at least one neural network 508, providing the machine learning kernel of the core module 102. The machine learning core 500 may be provided on a substrate 902 and coupled as a system to one or more active or passive components, support components, contact pads 904, and so forth, in a manner appreciated by those skilled in the art of application processors 602 and processing units 502. The internal electronic components may interact with other components through conductive traces, wires, and printed circuits, such as electrical connections between the pads 904 and the electrical "pin" connections 802 provided on the housing 800.

As above, the core components 500 may include electronic components such as the memory 504, power supply 608, user interfaces, and other suitable electronic components that support, improve, or otherwise affect the machine learning functions to be performed in the neural network 508. Some of these core components 500 may either be in the example housing 800, or these components may be in one or more other housings external to the example housing 800, and may interact with the other core components 500 through the electrical connections 802 of a port 806. The core components 500 communicate with the sensor module(s) 202 and other components through such electrical connections 802 and corresponding electrical circuits.

As mentioned above, the housing 800 for the core components 500 may have one or more ports 706 or sets of ports 806 & 808, each port 806 including one or more electrical connections 802 and one or more physical connection features 804. The figures shown herein illustrate examples of ports 706, 806 & 808, but other configurations may additionally or alternatively be provided. In certain implementations, the electrical connections 802 themselves can provide a physical coupling force between two housings 800, such as between a housing 800 of a core module 102 and a housing of a sensor module 202. For example, one type of electrical connection 802 may include socket and plug features, or magnetic clasp features. In such a case, separate physical connection features 804 may be omitted from a given port 806.

Each port 806 or set of ports 806 & 808 may permit electrical and data input and/or output from a machine learning kernel or core components 500 in a core module 102. In addition to the port 806 having symmetry, such that the plug and/or connection is reversible, in an implementation the port 806 may have a standardized or semi-universal layout so that multiple different sensors 202 or other diverse components may be interchangeably connected to the same port 806 or set of ports 806 & 808 at different times. One or more ports 806 may be provided on any viable side of a given core module 102. Once connected, the example port 806 may maintain a connection with the connected sensor module 202 or other component through magnetic, friction, latch, cord or other suitable mechanisms or forces.

In an implementation, there is not a physical connection between each and every module or component belonging to a given machine learning assembly 200, but instead at least one communicative coupling is a wireless one.

In certain implementations, the coupling between ports 806 is such that a sensor module 202 or other component can be non-destructively detached and reattached. Such a pluggable, releasable and reusable connection allows sensors 202 and other components to be replaced, or various sensors and components to be swapped out for each other. For example, such replacement or swapping may include replacement of a first sensor with a second sensor that has different functionality or performance than the first sensor, or other component.

As introduced above, the port 806 or sets of ports 806 & 808 may be provided on any of the viable surfaces of the housing 800 of a core module 102. The ports 806 or sets of ports 806 & 808 may be aligned symmetrically or in a pattern with respect to the surfaces. Opposing sides of a given example housing 800 may have similar ports 806 & 808 with a similar or even identical layout about a plane, axis, or point.

Figure 11:
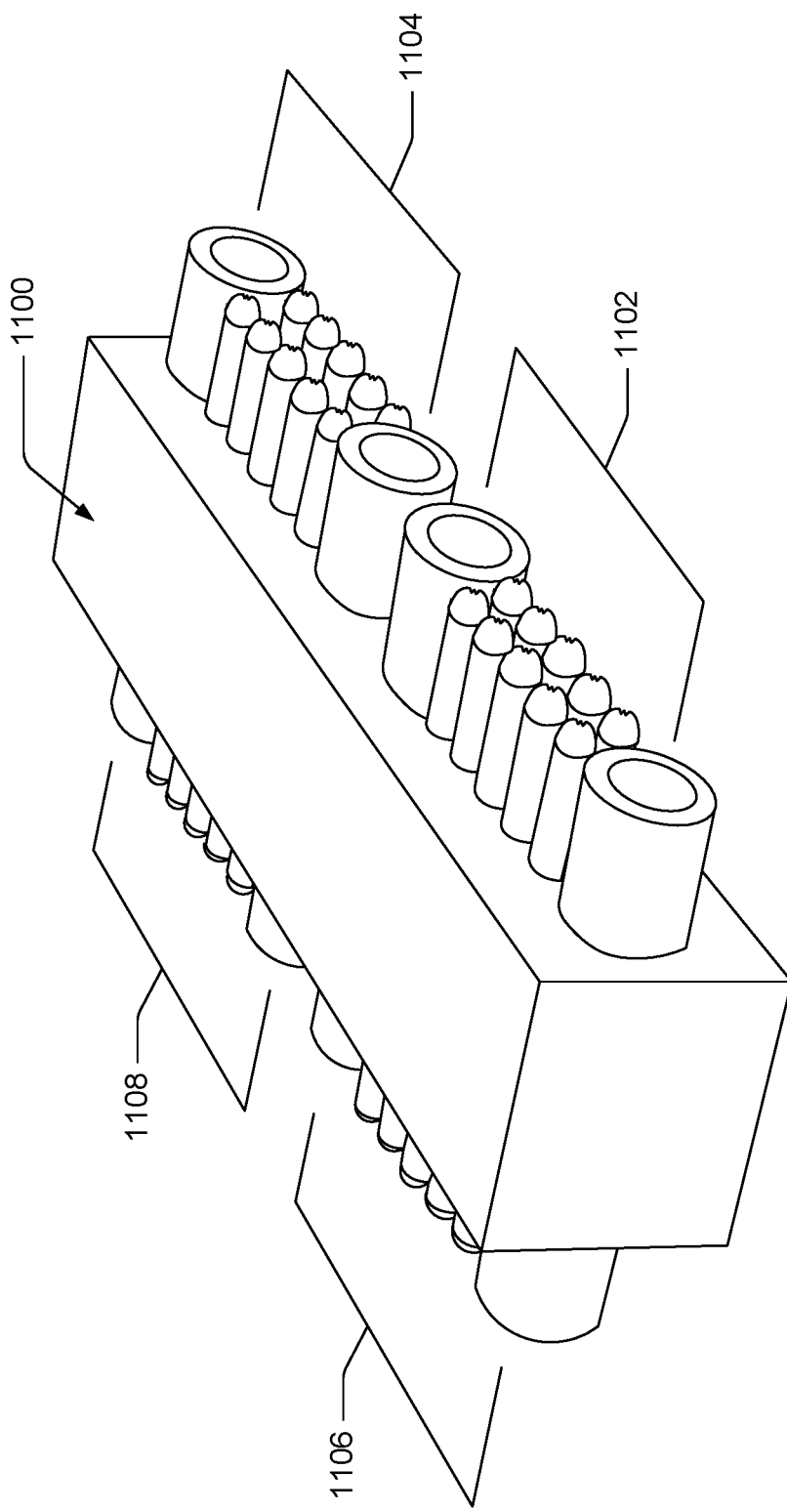

FIG. 11 shows an example interconnection component 1100. Each port connector 1102 or set of port connectors 1102 & 1104 is configured to interconnect, both physically and electrically, with a port 706 or set of ports 806 & 808 on the housing 800 of a module 102 or another interconnection component 1100. In the shown example, each side of the interconnection component 1100 may connect modules with single ports, such as two of module 102 in housing 700 shown in FIG. 7, connected, for example, on port connectors 1102 & 1104, or may connect one multiple-port module, such as module 102' in housing 800 shown in FIG. 8. On another side of the interconnection component 1100, port connectors 1106 & 1108 may interconnect still other modules to the modules connected to port connectors 1102 & 1104.

Electrical coupling depends on the internal wiring of the example interconnection component 1100. All four port connectors 1102 & 1104 & 1106 & 1108 may be wired together, so that each port connector couples with all of the other three port connectors. Or, in an implementation, port connector 1102 may be wired straight across to port connector 1106, and likewise port connector 1104 may be wired straight across to port connector 1108.

The modules being connected by interconnection component 1100 may be core modules 102 containing machine learning kernels and core components 500, modules 202 containing sensors (or sensor systems), or other electrical components or some combination thereof, each of these having at least one compatible port 706.

The example interconnection components 1100 can be rigid, semi-rigid, semi-flexible, or flexible. Interconnection allows data to be communicated in either direction between the sensor modules 202 and the core components 500 of a core module 102. The interconnection may also be configured directly without an interconnection module 1100, but either way interconnection enables signals to be passed through a first non-core sensor/component along to a second non-core sensor/component that is interconnected to the first sensor/component. In certain implementations it may be advantageous to interconnect the second non-core sensor/component back to a core module 102 to form a signal loop, for example.

Figure 12:
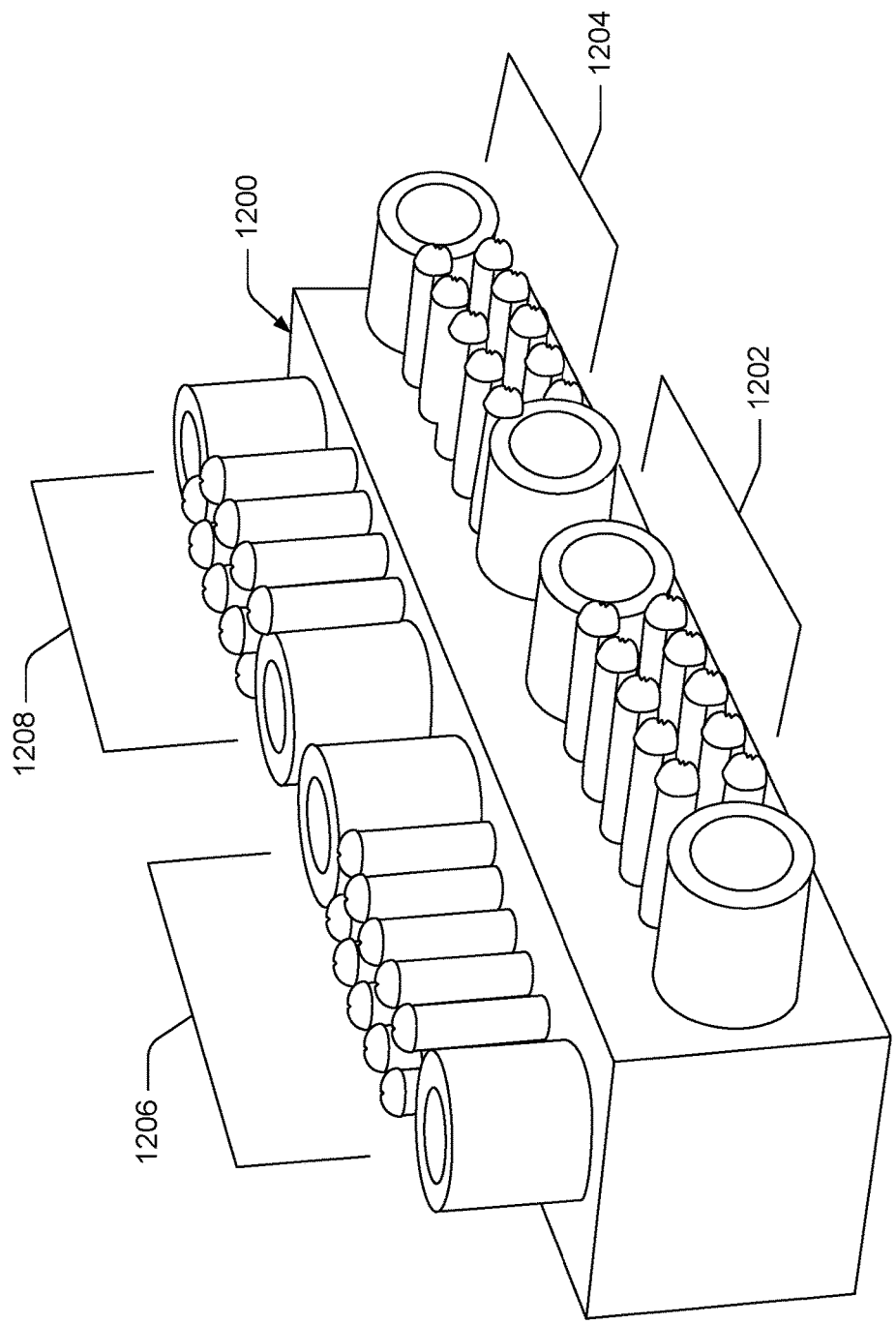

FIG. 12 shows another example interconnection component 1200. In this example, the port connectors 1202 & 1204 are disposed at 90 degrees to port connectors 1206 & 1208, thereby providing a right-angle interconnection member 1200 for building various structures of a machine learning assembly 100. Multiple instances of the interconnection component 1200 may also be used to create complex or custom shapes of a machine learning assembly 100 in different planes.

Figure 13:
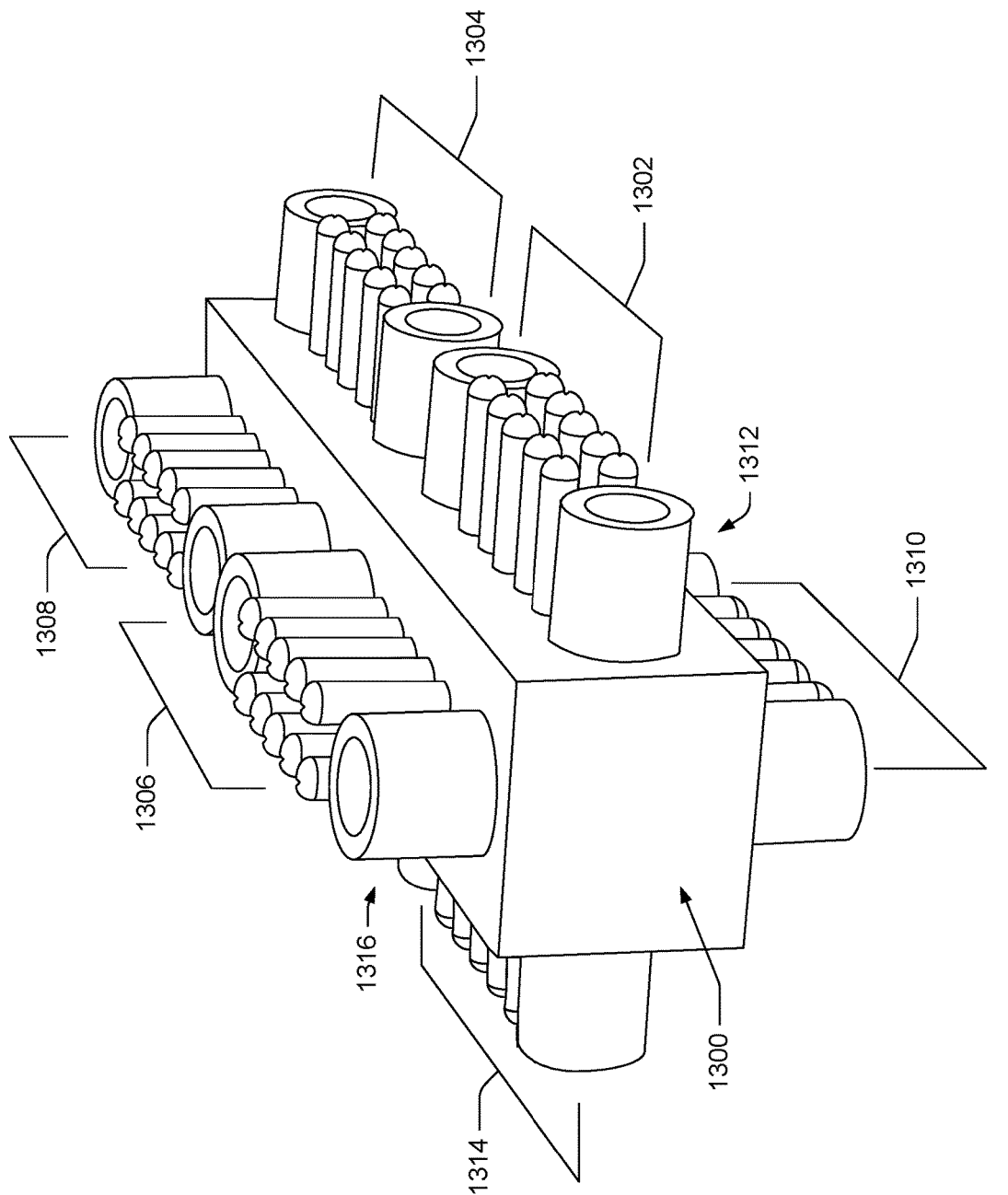

FIG. 13 shows an example ganged interconnection component 1300, with four-way port connection capability. The eight port connectors 1302 & 1304 & 1306 & 1308 & 1310 & 1312 & 1314 & 1316 of the example ganged interconnection component 1300 can connect up to eight modules 700 with single ports 706 or four modules 800 with double ports 806 & 808, for example. The example ganged interconnection component 1300 enables many possible arrangements, because different internal wiring schemes are possible, and because not all of the port connectors have to be utilized at once. For example, the example ganged interconnection component 1300 may connect modules on three of its sides, creating a first plane of modules with a second plane of modules perpendicular to the first plane. Or, the port connectors on all four sides may be utilized, to create two intersecting planes of modules. Example internal wiring schemes may include two straight-through, but separate electrical couplings, right angle electrical couplings, or common couplings in which all the port connectors are wired to each other.

Figure 14:
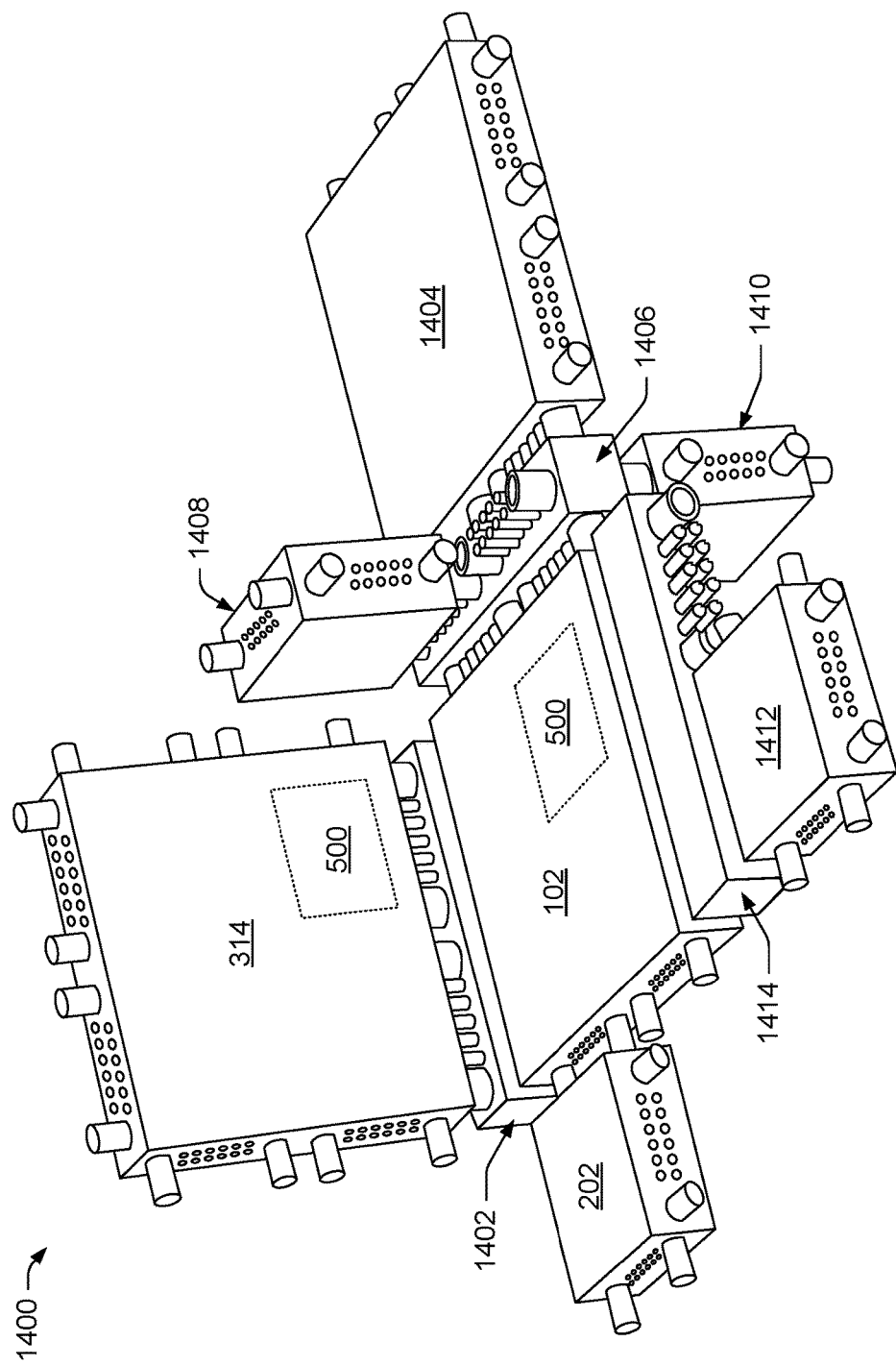

FIG. 14 shows an example configuration of a machine learning assembly 1400, with core modules 102 & 314, each containing at least one set of core components 500 & 500', coupled together via interconnection module 1402. Sensor module 202 is coupled with core module 102, utility module 1404 is coupled to core module 102 via interconnection module 1406, sensor modules 1408 & 1410 are coupled to core module 102 and to utility module 1404 via interconnection module 1406. Sensor module 1412 is coupled to core module 102 via interconnection module 1414.

The example utility module 1404 may be an additional sensor system, a camera system, a computing system, a laboratory-on-a-chip module, a GPS system, an accelerometer, flash drive mass data storage, a wireless Wi-Fi or infrared transceiver, a battery, or can be one of numerous other electrical, electronic, or optical components or systems. The utility module 1404 can also be an executive component performing the executive output 512 of the neural network 508, such as a controller, an actuator, an alarm, a solenoid, a navigation system, a user interface intermediary, a display driver, camera electronics, a transmitter, an electrode, a digital to analog converter, an implantable medical device interface, an insulin pump controller for a medical patient, a pacemaker trigger, an implantable cardioverter-defibrillator interface, a hospital IV pump controller, a pager, a cell phone element, a heating-air-conditioning-and-ventilation governor, and so forth, as examples.

In an implementation, the modules of the example machine learning assembly 1400 are very small, and the finished structure may be secured to a motherboard or device, for example. The example machine learning assembly 1400 may also be permanently encapsulated, if the configuration of the assembly 1400 is finalized and various sensor modules 202 will not need to be replaced, or, if the entire assembly 1400 is deemed replaceable or disposable when the hosting device expends its lifespan. Larger versions of the example machine learning assembly 1400 may be approximately 6-7 millimeters on a side, and may be encapsulated or otherwise made into a permanent assembly 1400, but the example machine learning assembly 1400 may also be left configurable for later modification, with the pluggable and detachable modules capable of being detached, replaced, and swapped.

Figure 15:
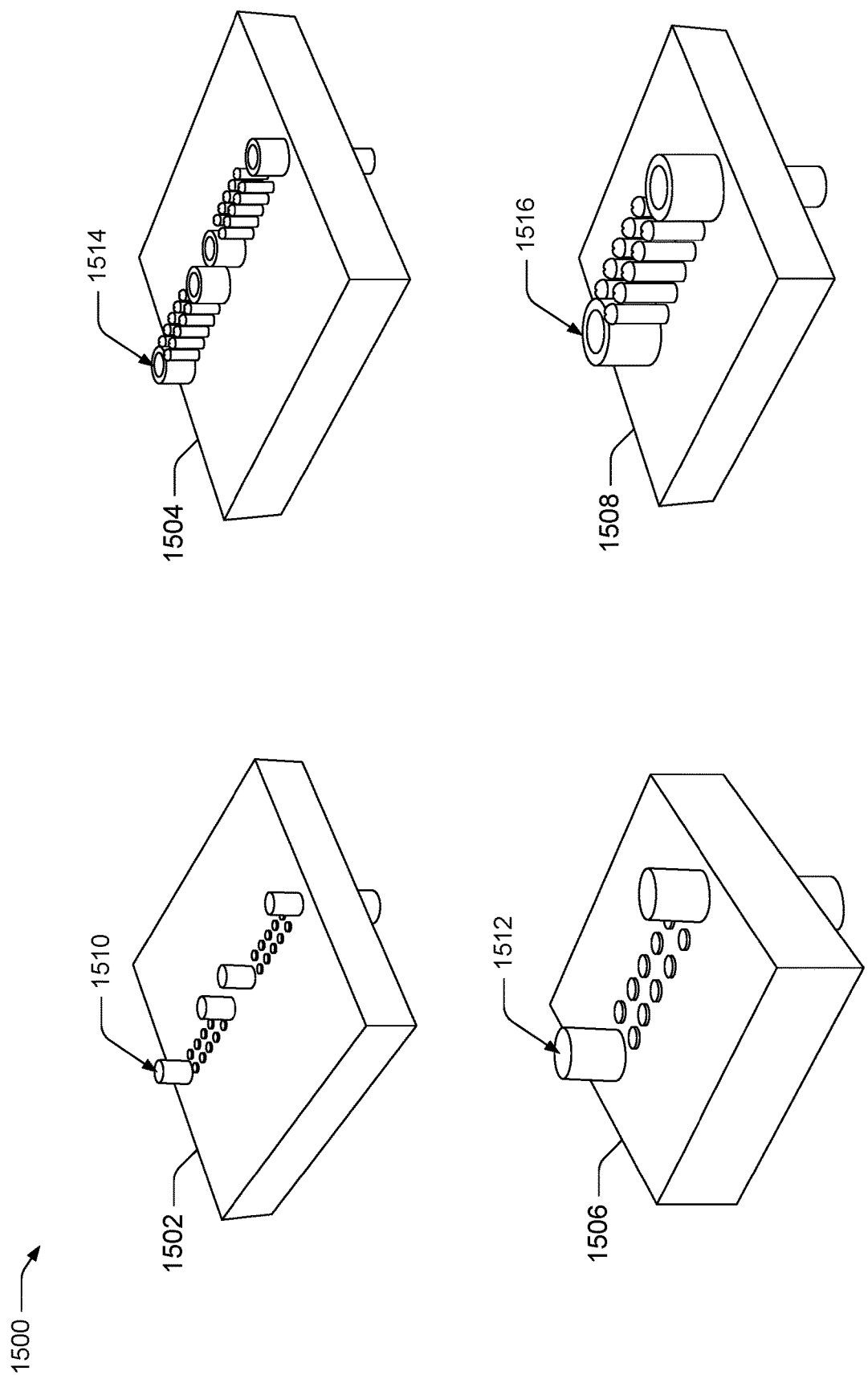

FIG. 15 shows additional implementations of various housings 1500 for the modules of an example machine learning assembly 200. The example modules 1502 & 1504 & 1506 & 1508 may be used for core modules 102, sensor modules 202, or other components in order to permit stacking with or without discrete interconnection modules 1100 & 1200 & 1300. Stacking without interconnection modules 1100 & 1200 & 1300 may be accomplished by creating male 1510 & 1512 and female 1514 & 1516 ports on the large major faces of the modules 1502 & 1504 & 1506 & 1508, so that the ports couple directly with each other when the modules are stacked.

Figure 16:
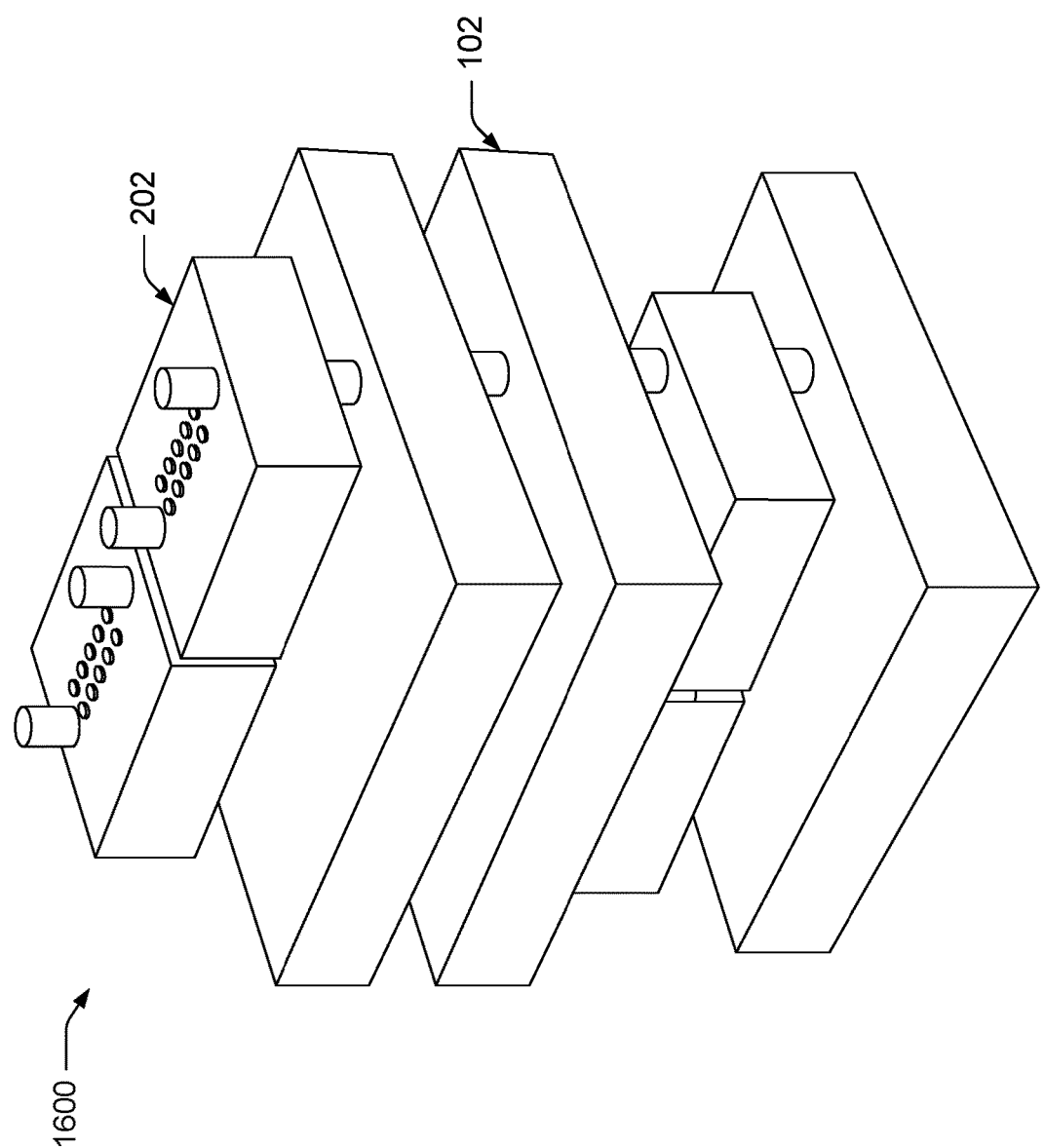

FIG. 16 shows an example machine learning assembly 1600 created by stacking, and thereby connecting various core modules 102 and sensor modules 202 without using interconnection modules 1100 & 1200 & 1300. The example machine learning assembly 1600 of FIG. 16 is stacked in one dimension, but the modules of the example machine learning assembly 1600 may also have ports, e.g., 806 & 808, on minor surfaces of the modules, thereby allowing structure assembly in more than one dimension.

Example Operations

Figure 17:
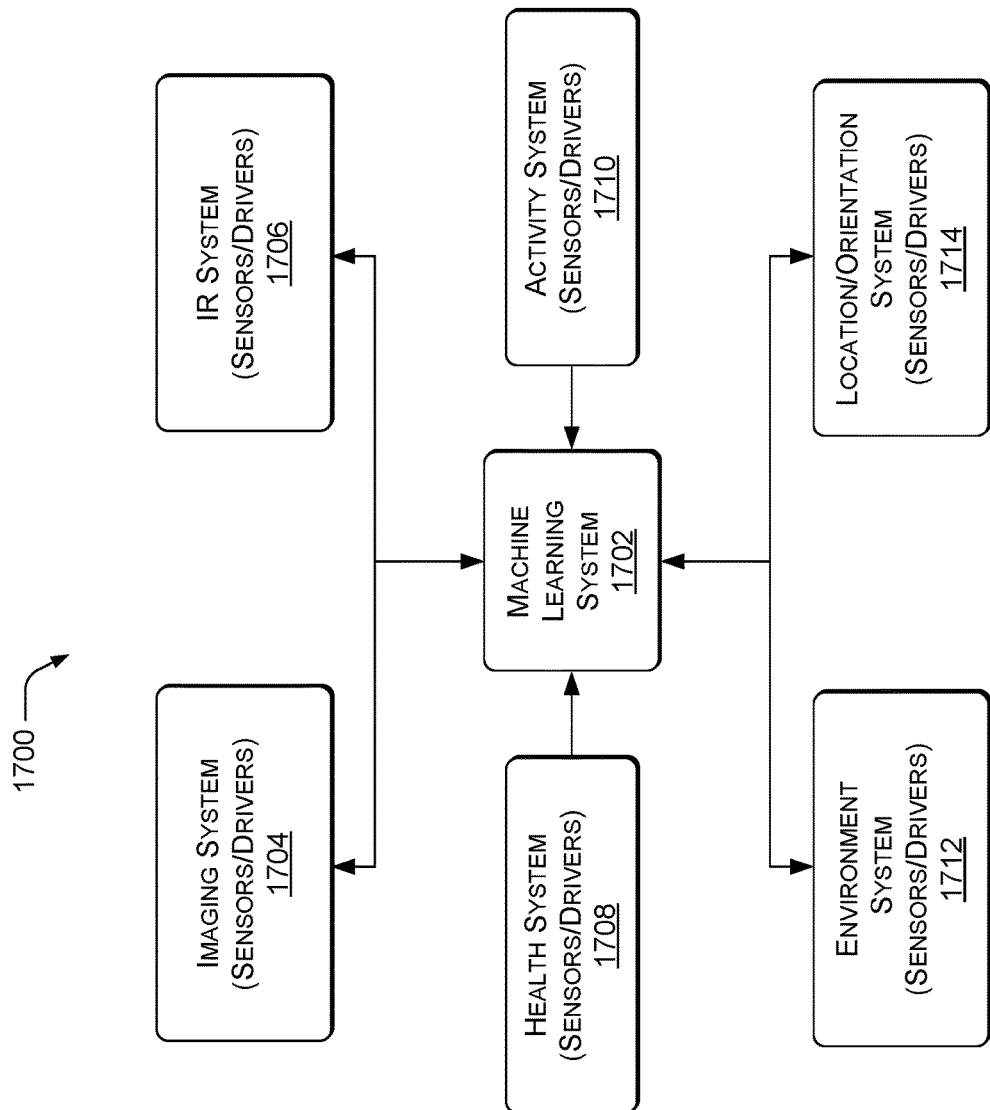

FIG. 17 shows a schematic of an example machine learning assembly 1700 or system. The example machine learning assembly 1700 may include a machine learning system 1702, embodied, for example, by at least one core module 102 containing at least one set of core components 500. The example system 1700 may also include one or more executive and sensing systems, each with its own sensors, drivers, actuators, and programming as needed, such as imaging system 1704, infrared sensor system 1706, health system 1708, activity system 1710, environment system 1712, and location/orientation system 1714, as examples.

Other components may include the power supply component or input 608, the memory component 504, data storage 506, and so forth. In certain implementations, the example machine learning assembly 1700 performs a machine learning function (or plurality of functions) without relying on computational support from remote computing resources, such as cloud connected server machines. Thus, the example machine learning assembly 1700 can operate independently of a computer network, such as the internet, external Wi-Fi, and so forth, although such functionality may be used for reporting on activity or for reconfiguring, maintaining, updating, and otherwise interacting with the example system 1700, for example through a user interface. The example machine learning assembly 1700 may send the results of processing the sensor(s) data 510 or the executive output 512 to a locally or remotely located machine, processor, data center, or server facility. The example machine learning assembly 1700 generally isolates the sensor data 510 within the system 1700. The example machine learning assembly 1700 may also keep the executive output 512 local and isolated within the example machine learning assembly 1700 or within the device hosting the example machine learning assembly 1700. Data output by the example machine learning assembly 1700 may be smaller than the data provided by one or more sensor modules 102 or sensor systems 1704-1714. Thus, data collected by the example machine learning assembly 1700 may also be discarded once processed. More specifically, data collected by a sensing module 202 may be discarded (e.g., deleted) after the example machine learning assembly 1700 processes the data.

At the heart of the example machine learning assembly 1700 is at least one machine learning kernel embodied in some of the example core components 500 (see examples in FIGS. 5-6). The example core components 500 may be surrounded by a housing, for example housing 700 or 800, and contain at least one component configured to perform at least one machine learning function. The machine learning function is understood by the skilled artisan to mean processing or interpreting information collected by a sensor, and self-learning to provide a useful output based on the processing or interpretation of the collected information. The artificial neural network 508 assists with the machine learning function.

The neural network 508 may be a system of programs, applications and/or data structures that simulate or approximate the behavior of artificial or biological neural networks. A neural network 508 may in some cases employ instructions written in a programming language to animate hardware used to modify the behavior of a machine or transform a physical property in the real world.

Many different types of neural networks 508 may be used in the example machine learning assembly 1700. Neural networks in general may involve a large number of processors operating in parallel, each with its own small sphere of knowledge and access to data in its local memory. However, in a preferred embodiment, an example neural network 508 used herein provides efficient and hardy machine learning, resulting in a low power consumption or low power demand on the machine learning system 1700. In addition to being more efficient, an example neural network 508 is more easily trained than conventional neural networks. Example neural networks 508 having some or all of the aforementioned properties are described in U.S. patent application Ser. No. 15/224,632 to Teig, filed Jul. 31, 2016, U.S. patent application Ser. No. 15/231,787 to Teig, filed Aug. 9, 2016, and U.S. patent application Ser. No. 15/231,789 to Teig, filed Aug. 9, 2016, which are incorporated by reference herein in their entireties.

A neural network 508 to be utilized herein may be based on a mathematical model associated with a particular learning algorithm or learning rule. The example neural network 508 can be composed of a large number of highly interconnected processing elements (nodes) working in unison to solve a specific problem. An example node can be a device with many inputs and one output. In an implementation, the example node may have two modes of operation, a training mode and an operating mode. In the training mode, the node can self-train or be trained to detect particular input patterns. In the operating mode, when a learned input pattern is detected at the input, its associated output becomes the current output, subject to further iterations of the machine learning function within the example neural network 508.

An example machine-trained (MT) neural network 508 that may be used in some embodiments may utilize novel processing nodes with novel activation functions 610 that allow the MT neural network 508 to efficiently define a scenario with fewer processing node layers to solve a particular problem (e.g., face recognition, speech recognition, pattern recognition, and so forth). In some embodiments, the same activation function 610 is used for numerous processing nodes of the MT neural network 508, but through machine learning, the activation function 610 is configured differently for different processing nodes so that different nodes can emulate or implement two or more functions (e.g., two different periodic functions, two different logical Boolean operators, etc.), thereby accomplishing more with fewer nodes.

Each processing node in an example neural network 508 may have a linear component and a nonlinear component. The linear component of each processing node may implement a weighted sum 612 of the inputs to its processing node (e.g., a weighted sum of the outputs of the prior processing nodes from which the currently processing node receives). The nonlinear component of each processing node computes a function based on the output of the linear component. This function is an activation function 610.

The processing unit 502 controls and implements the example neural network 508. The term "processing unit 502" encompasses numerous types of apparatuses, devices, and machines for processing data, including by way of example a programmable processor 602, a computer, or multiple processors 602 or computers. The processing unit 502 can embody special purpose logic circuitry, e.g., an FPGA (field programmable gate array 604) or an ASIC (application-specific integrated circuit). The processing unit 502 and the memory 504 can be supplemented by, or incorporated in, special purpose logic circuitry. The processing unit 502 can also include, in addition to hardware, code that creates an execution environment for the computer program in question, e.g., code that constitutes processor firmware, a protocol stack, a database management system, an operating system, or a combination of one or more of these. The data storage medium 506 can be a machine-readable storage device, a machine-readable storage substrate, a random or serial access memory device, or a combination of one or more of these. In some embodiments, the processing unit 502 and memory 504 may be integrated into a single unit. Generally, the processing unit 502 receives instructions and data from a read only memory 504 or a random access memory 504 or both.

Sensors and Other Components

According to one implementation, the example machine learning assembly 1700 may include one or more sensor modules 202 or sensor systems 1704-1714, each sensor module 202 or system 1704-1714 sensing an external quality, such as time, location, orientation, environment (liquid/gas), visible light, image, audio, video, IR/UV spectrum, pressure, temperature, volume, pH, speed, acceleration, vibration, GPS global position, heartbeat, blood pressure, machine status, game state, to name but a few. Sensors and/or software may be part of a sensor module 202 or sensing system 1704-1714. Sensed information may be converted to digital data via an analog-digital converter 606 and provided via electrical signal to the example core components 500.

The machine learning kernel embodied in the neural network 508 can process the digital data and in response, performs some physical or machine action, based on reporting the data, summarizing the data, modifying the data, and may also modify the machine learning model itself in response to the data. The core components 500 may process the digital data with no further input from outside the local machine learning assembly 200 or 1700, for example.

As an operational example, assume that a sensing system 1704 is an imaging system located in an automobile and has been trained to recognize pedestrians. Analog data is captured by the imaging system 1704 and sent to the example core components 500. The analog data is converted by an analog-digital converter 606 to digital data and sent to the processing unit 502. If the neural network 508 recognizes or learns a pattern that indicates the presence of a pedestrian near a travel path of the automobile, the executive output 512 is used to alert the driver that a pedestrian is nearby.

In an implementation, a sensing system 1704-1714 and other modular components of an example machine learning assembly 1700, including core modules 102 and interconnection components 1100 & 1200 & 1300, are altogether combined to result in a package on the order of one-quarter cubic inch in volume, or smaller. In an implementation, the efficiency of the implemented neural network 508 may consume power at a rate less of one watt of power on average.

The example machine learning assembly 1700 may be substantially enclosed or may have optional apertures (e.g., a perforated cover) to allow signal sensing, monitoring of environmental conditions, and permit the cooling of the core components 500, as examples. In an implementation, the example machine learning assembly 1700 may have a transparent cover such as glass, plastic or other suitable material to allow a user to inspect the example core components 500, interact through a image capturing component, perform flash programming, and so forth.

In an implementation, the auto-detector 626 determines that a particular sensing system 1704-1714 or other component has become connected or disconnected to the example machine learning assembly 1700. The function and data-type parser 628 may auto-identify the functionality and data protocol that will be provided to or from a particular newly connected sensing system 1704-1714, sensor module 202, or other component. For example, a user may initially couple an image sensor 1704 to the example machine learning assembly 1700, but later decide to instead couple, or additionally couple, a temperature sensor, gas sensor, etc., to the example machine learning assembly 1700. The example machine learning assembly 1700 is configured to recognize that the data is new data and the parser 628 can determine what to do with the new incoming data 510. The parser 628 can use known detection techniques, such as identification codes 624 or similar measures. The appropriate weights 612 and/or activation functions 610 to apply to nodes of the neural network 508 to represent input from each type of sensing system 1704-1714 can be stored in memory 504 and applied to the neural network 508 as the particular sensing system 1704-1714 is detected and recognized. For example, if a gas sensor is added to an image sensor 1704, the machine learning assembly 1700 may recognize that the system should monitor ambient gas conditions when humans are present, but not when robots are present and may utilize this information to make a decision, report on the conditions, and so forth. Alternatively, if the image sensor 1704 is removed and the gas sensor is added, the example machine learning assembly 1700 recognizes that the system should optimize ambient gas conditions based on undesired deviations in the ambient gas conditions, for example.

Example Methods

Figure 18:
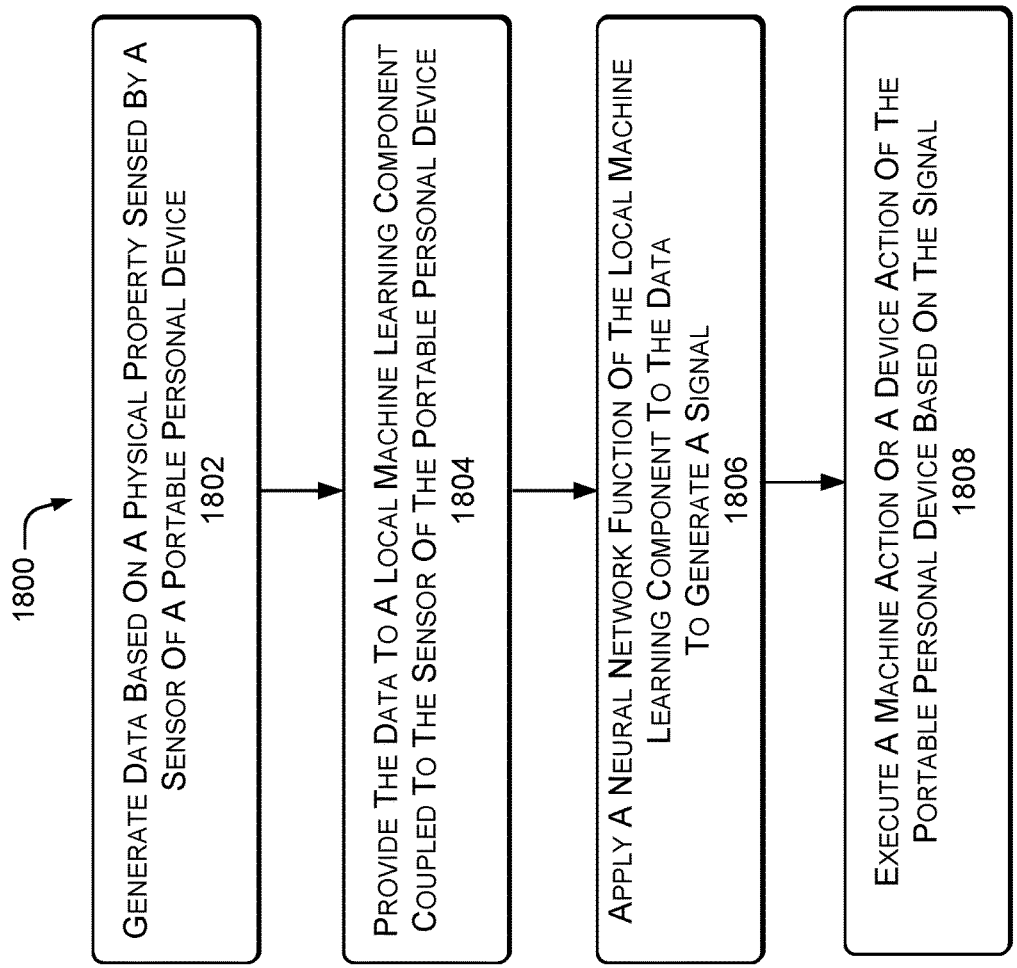

FIG. 18 shows an example method 1800 of autonomously operating a configurable machine learning assembly in a portable personal device. In the block diagram of FIG. 18, operations are shown in individual blocks. The example method may be performed by hardware, such as by an example machine learning assembly 200 containing an example core module 102 and further containing at least one set of example core components 500.

At block 1802, data based on a physical property is sensed by a sensor of a portable personal device.

At block 1804, the data is provided to a local machine learning component coupled to the sensor of the portable personal device.

At block 1806, a neural network function of the local machine learning component is applied to the data to generate a signal.

At block 1808, a machine action or a device action of the portable personal device is executed based on the signal.

Figure 19:
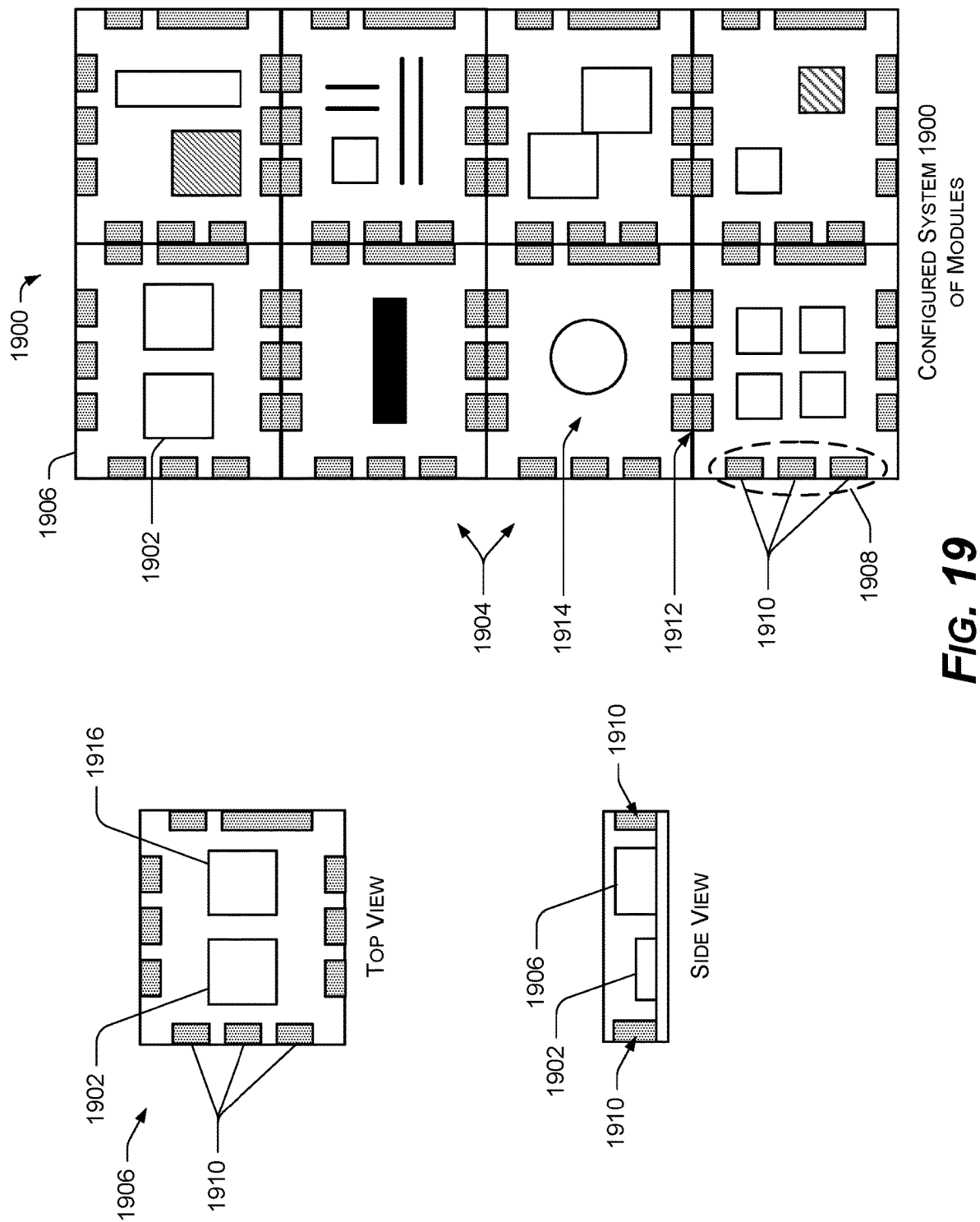
FIGS. 19-25 describe the example configurable smart object system including magnetic contacts and magnetic assembly.

Example Configurable Smart Object System With Magnetic Contacts and Magnetic Assembly FIG. 19 shows an example smart object system 1900 that is based on machine learning electronics 1902, for example. In an implementation, the smart object system 1900 includes example multiple modules 1904 capable of being coupled with each other in different configurations. At least one module of the multiple modules 1904 comprises an example core module 1906 containing a machine learning engine 1902. In an implementation, the multiple modules 1904 each have at least one instance of a commonly configured interface 1908 for coupling with each other, and magnetic electrical contacts 1910 in each of the commonly configured interfaces 1908 made of a magnet or a magnetic material that is also electrically conductive, for physically coupling the instances of the commonly configured interface 1908 to each other 1912 while providing an electrical coupling across the coupled interfaces 1912.

The multiple modules 1904 may include at least one sensor module 1914 electrically coupled and physically coupled to another module of the smart object system 1900 via the magnetic electrical contacts of an instance of the commonly configured interface 1908.

In an implementation, the magnetic electrical contacts 1910 can be symmetrically placed power, ground, and data contacts, providing a reversible interface 1908 between modules of the smart object system 1900. In such an implementation, modules 1906 can be connected, detached, and reconnected without regard for orienting the interfaces 1908 between the modules.

A controller 1916 or other smart electronics of a core module 1906 of the smart object system 1900 can dynamically assign the individual magnetic electrical contacts 1910 of the commonly configured interface 1908 to be power, ground, or data connections to provide a changeable or a reversible interface 1908 between modules of the smart object system 1900.

Figure 20:
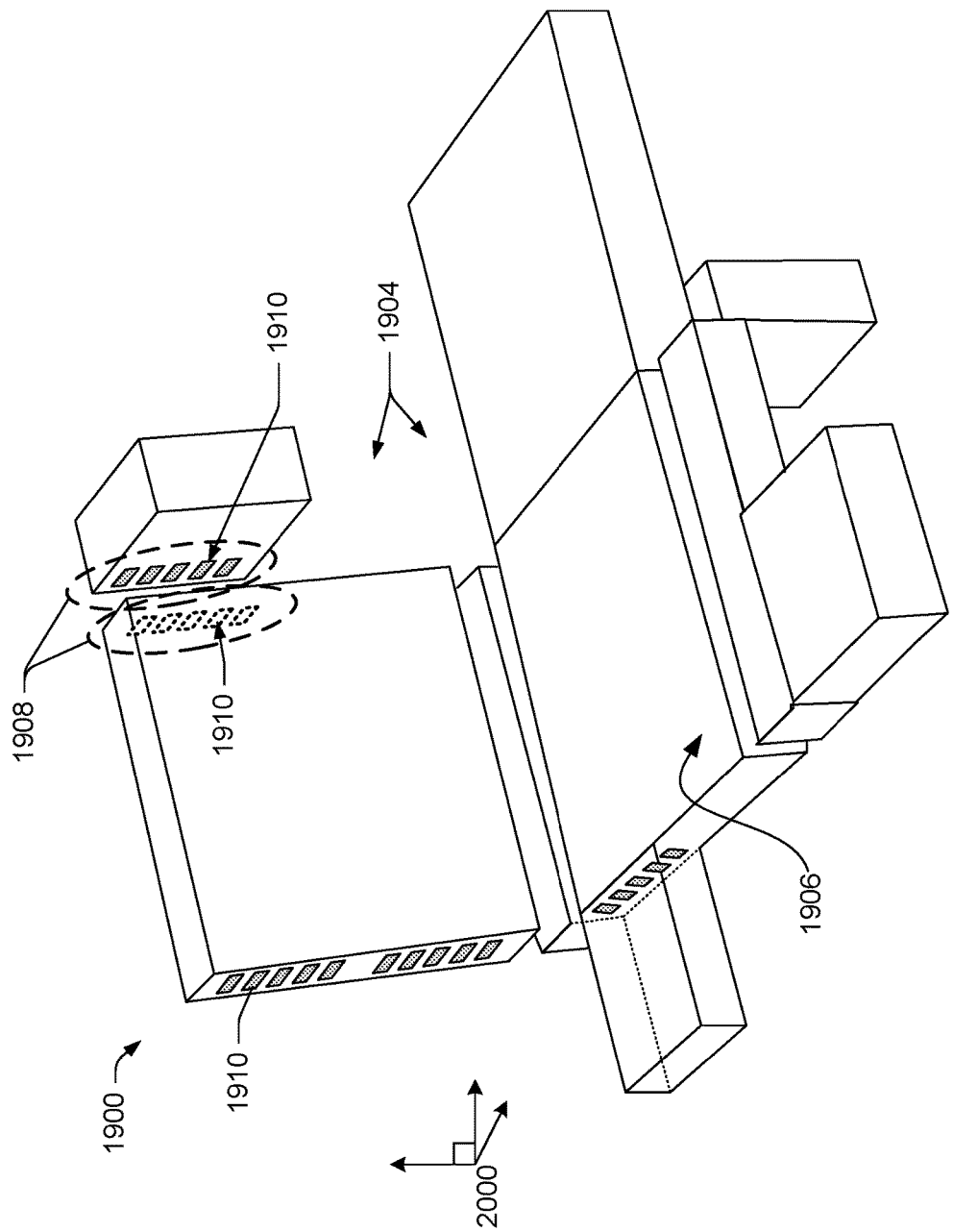

As shown in FIG. 20, the magnetic electrical contacts 1910 can also secure the multiple modules 1904 of the system 1900 together in three dimensions to form various 3-dimensional structures 2000 of the smart object system 1900.

During assembly of an example smart object system 1900 using the modules 1904, a core module 1906 can dynamically assign and reassign electrical power, electrical ground, and/or data channels to the magnetic electrical contacts 1910 between the multiple modules 1904 to configure and reconfigure a control network or a communication network "nervous system" between the multiple modules 1904.

The magnetic electrical contacts 1910 of the commonly configured interfaces 1908 can be disposed on one or more edges of the multiple modules 1904, and the multiple modules 1904 can couple with each other with such edge-to-edge interfaces 1908.

Figure 21:
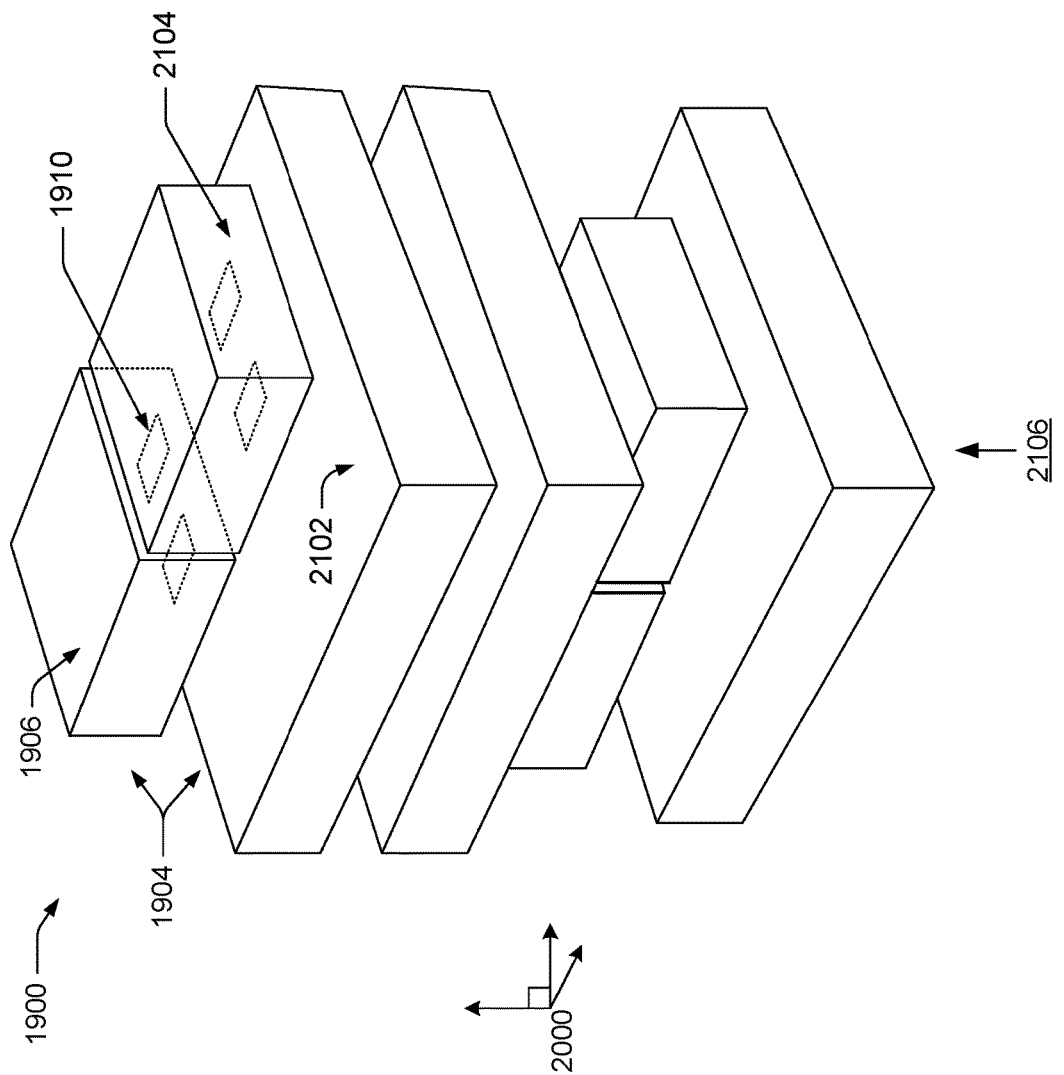

As shown in FIG. 21, the magnetic electrical contacts 1910 can also be disposed on one or more major faces 2102 of the multiple modules 1904, and the multiple modules 1904 can couple with each other with face-to-face interfaces 2104, to make various stacks 2106.

In an implementation, the multiple modules 1904 are flat, and so the multiple modules 1904 can stack vertically together 2106 via the commonly configured interfaces 1908 disposed on face surfaces 2102 of the multiple modules 1904. The multiple modules 1904 can also expand horizontally by edge-to-edge coupling (as in FIG. 20) with each other via the commonly configured interfaces 1908 disposed on edges of the multiple modules 1904.

From the standpoint of a module 1906 of the smart object system 1900, a module 1906 can be made up of a housing member capable of holding electronic circuitry of the smart object system 1900, and at least one instance of an interface 1908 on at least one side of the housing member. Each interface may comprise at least one magnetic electrical contact 1910, and each magnetic electrical contact 1910 is capable of physically (e.g., magnetically) securing the magnetic electrical contact 1910 with a complementary electrical contact or magnetic electrical contact on another component of the smart object system 1900. Each magnetic electrical contact 1910 is also capable of electrically coupling with a complementary electrical contact on the other component of the smart object system 1900.

Examples of "other" components of the smart object system 1900 just addressed, can be another module 1906 of the smart object system 1900 that has at least one instance of the interface 1908 on at least one side of the housing member of the other module 1906, or a connector for coupling the module to a motherboard, or can be a socket for coupling the module to the motherboard, wherein the socket has one or more instances of the common interface 1908 or another compatible interface.

The electronic circuitry contained by the housing member of a module of the smart object system 1900 can be a sensor circuitry, a machine learning engine 1902, connection circuitry, interconnect circuitry, or interposer circuitry, for example. As above, each interface 1908 may be reversible.

Example Methods

Figure 22:
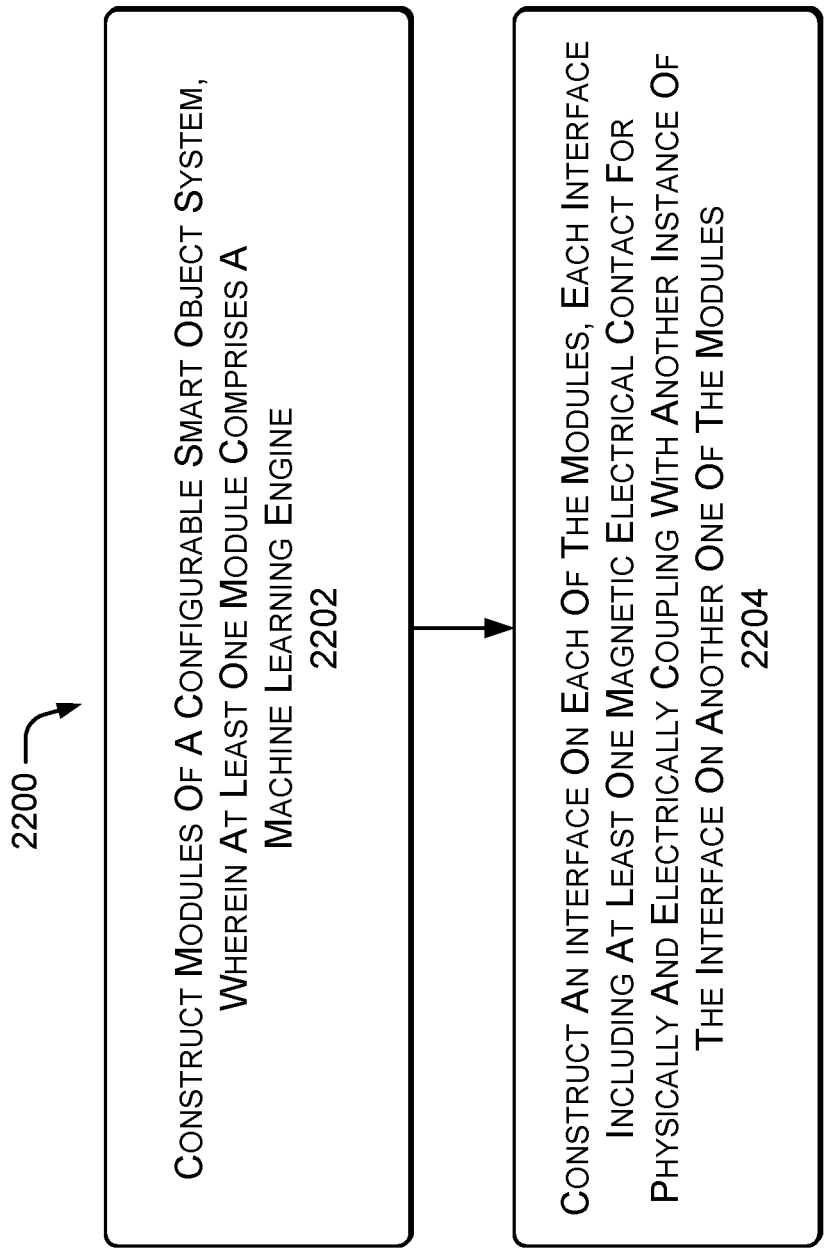

FIG. 22 shows an example method 2200 of constructing interfaces on modules of a smart object system, that has a machine learning engine, for example. In the flow diagram, operations of the example method 2200 are shown as individual blocks.

At block 2202, modules of a configurable smart object system are constructed, with at least one module comprising a machine learning engine.

At block 2204, at least one instance of an interface is constructed on at least some of the modules, with each interface including at least one magnetic electrical contact for physically and electrically coupling with a magnetic member or another instance of the magnetic electrical contact on another instance of the interface of another module of the system.

The method may include creating interfaces, including the magnetic electrical contacts, that are preferably reversible on each of the modules that have an interface. A reversible interface has contacts and/or attachment members, such as the magnetic electrical contacts, that make equivalent electrical and data connections in multiple connection orientations. For example, a linear interface can make equivalent connections when the module is flipped 180 degrees.

Figure 23:
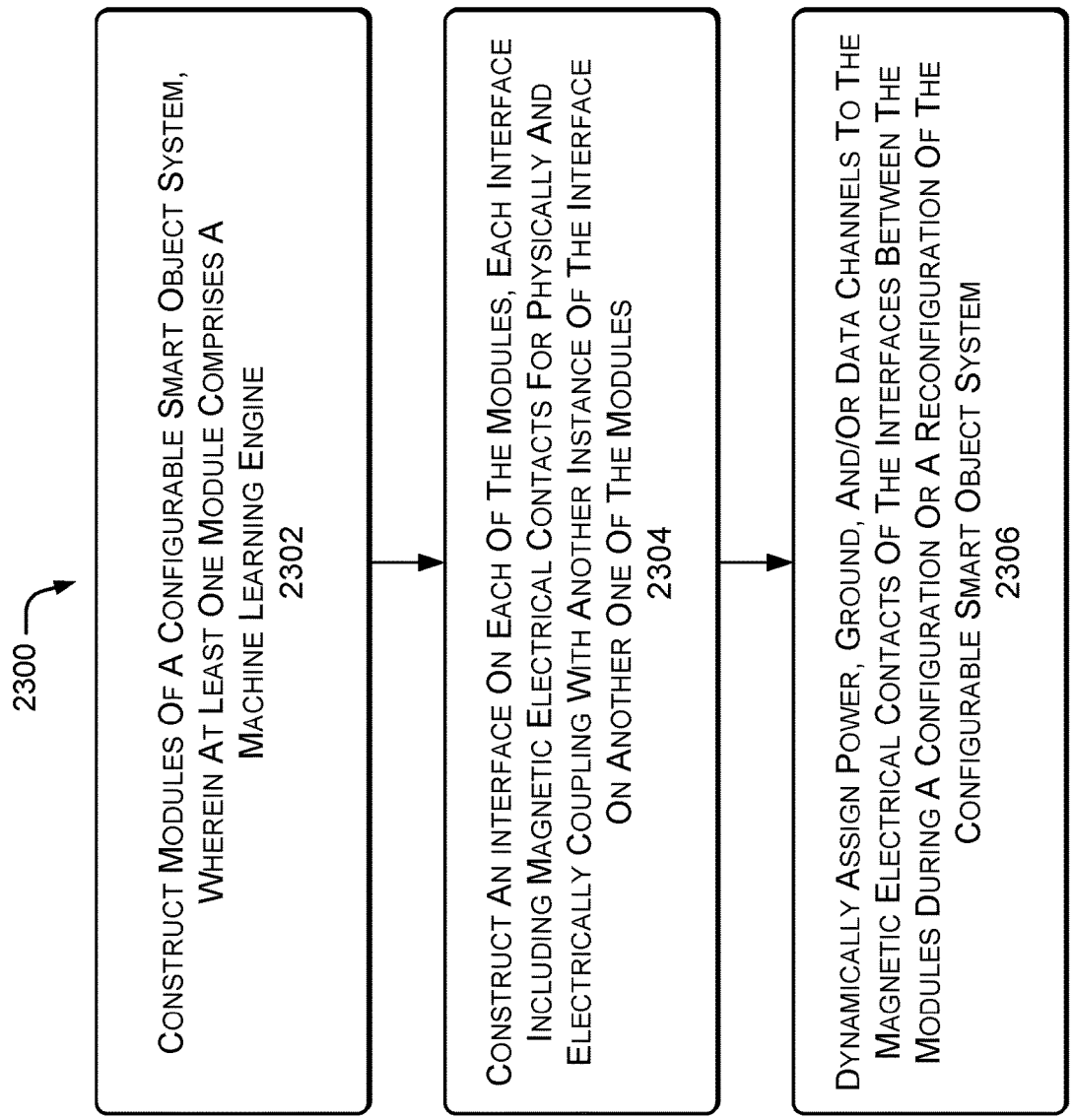

FIG. 23 shows an example method 2300 of constructing interfaces on modules of a smart object system, for example a smart object system that has a machine learning engine, with magnetic electrical contacts that are dynamically assignable by a controller or a core module of the smart object system. In the flow diagram, operations of the example method 2300 are shown as individual blocks.

At block 2302, modules of a configurable smart object system are constructed, with at least one module comprising a machine learning engine.

At block 2304, at least one instance of an interface is constructed on at least some of the modules, with each interface including at least one magnetic electrical contact for physically and electrically coupling with a magnetic member or another instance of the magnetic electrical contact on another instance of the interface of another module of the system.

At block 2306, an example system dynamically assigns power, ground, and/or data channels to the magnetic electrical contacts of the interfaces between the modules during a configuration or a reconfiguration of the configurable smart object system. In other words, in an implementation, the pinouts of the interfaces of the modules are not static, but can be configured on the fly, by the system itself, or by a human programmer, when a given smart object system has a user interface or a programmable core.

Figure 24:
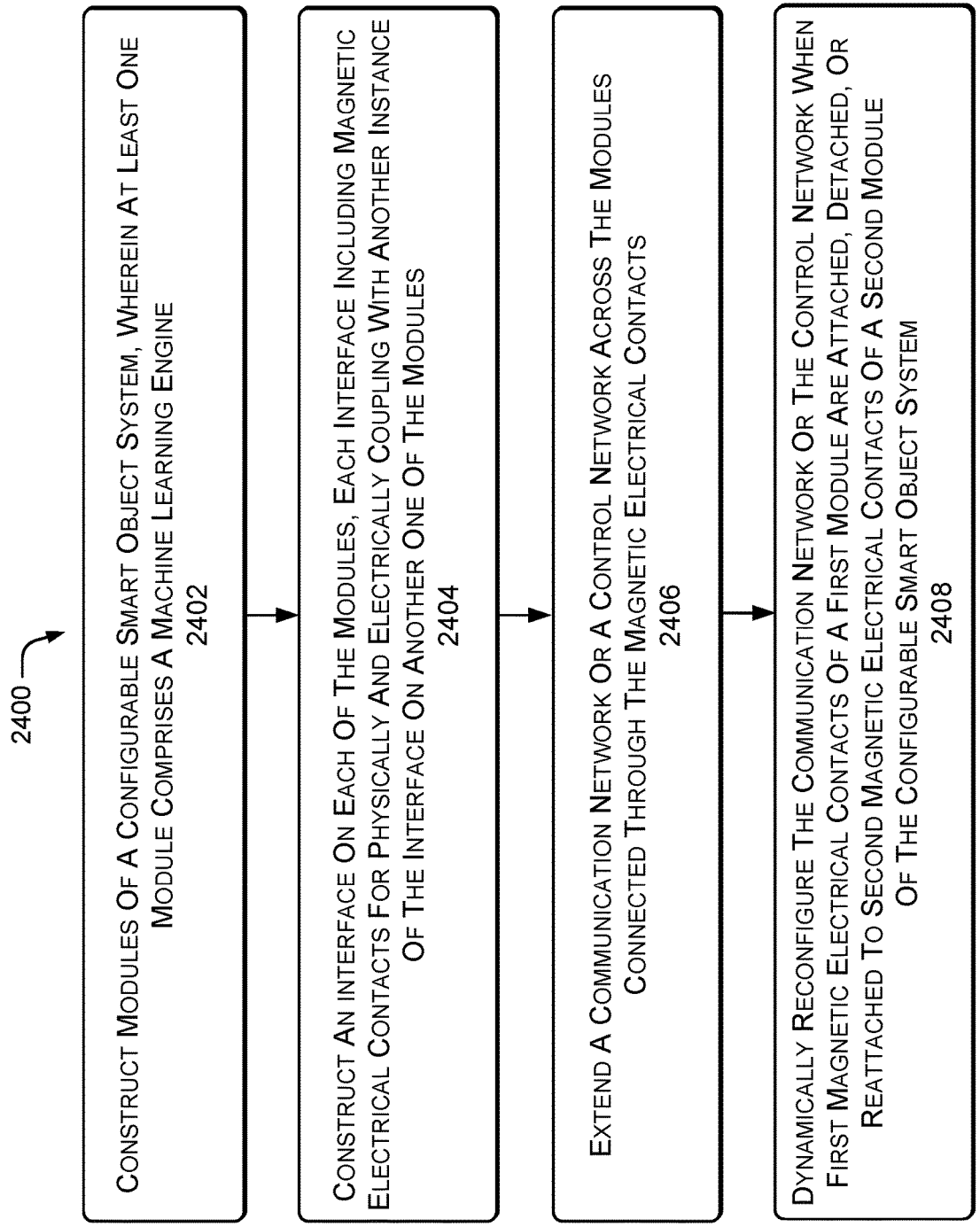

FIG. 24 shows an example method 2400 of dynamically configuring a network across multiple modules of a smart object system in real time according to a changing configuration of the modules of the system. In the flow diagram, operations of the example method 2400 are shown as individual blocks.

At block 2402, modules of a configurable smart object system are constructed, with at least one module comprising a machine learning engine.

At block 2404, at least one instance of an interface is constructed on at least some of the modules, with each interface including at least one magnetic electrical contact for physically and electrically coupling with a magnetic member or another instance of the magnetic electrical contact on another instance of the interface of another module of the system.

At block 2406, a communication network or a control network is extended across the multiple modules connected together through the magnetic electrical contacts.

At block 2408, the communication network or the control network is dynamically reconfigured in real time when first magnetic contacts of a first module are attached, detached, or reattached to second magnetic contacts of a second module of the smart object system.

Figure 25:
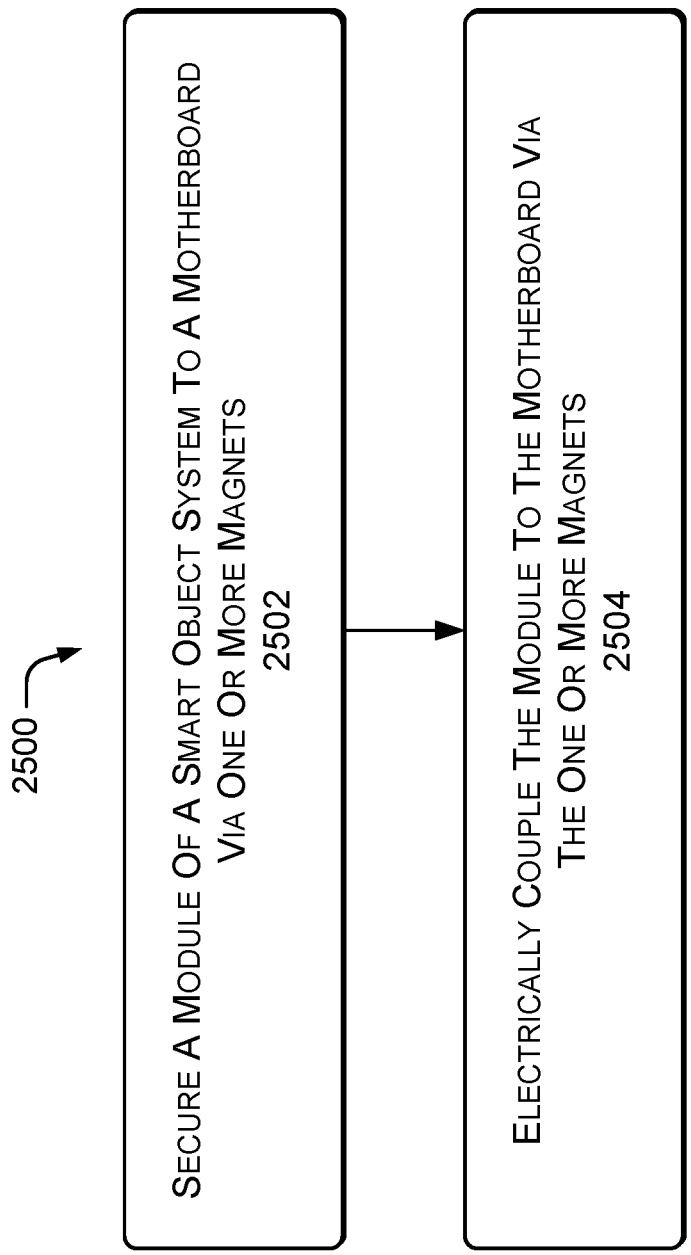

FIG. 25 shows an example method 2500 of attaching a module to a motherboard in a smart object system. In the flow diagram, operations of the example method 2500 are shown as individual blocks.

At block 2502, a module of a smart object system is secured to a motherboard via one or more magnets.

At block 2504, the module is electrically coupled to the motherboard via the same one or more magnets.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific dimensions, quantities, material types, fabrication steps and the like can be different from those described above in alternative embodiments. The term "coupled" is used herein to express a direct connection as well as a connection through one or more intervening circuits or structures. The terms "example," "embodiment," and "implementation" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

The invention claimed is:

1. An apparatus, comprising:
  a smart object system;
  multiple modules of the smart object system capable of being coupled with each other in different configurations;
  at least one module of the multiple modules comprising a core module containing a machine learning engine;
  the multiple modules each having at least one instance of a commonly configured interface capable of coupling with each other;

magnetic electrical contacts of the commonly configured interface each comprising a magnet or a magnetic material for physically coupling the instances of the commonly configured interface to each other while providing an electrical coupling across the coupled interfaces; and a socket attachable to a motherboard;

at least one magnet in a floor of the socket;

at least one magnetic electrical contact of a module of the smart object system disposed on at least a face the module;

wherein the at least one magnet in the floor of the socket secures the module to the socket via the at least one magnetic electrical contact on the at least one face of the module; and wherein the at least one magnet in the floor of the socket establishes an electrical contact with the module via the at least one magnetic electrical contact on the at least one face of the module.

2. The apparatus of claim 1, wherein the multiple modules include at least one sensor module electrically coupled and physically coupled to another module of the smart object system via the magnetic electrical contacts of the commonly configured interface.

3. The apparatus of claim 1, wherein the magnetic electrical contacts comprise symmetrical power, ground, and data contacts providing a reversible interface between modules of the smart object system.

4. The apparatus of claim 1, wherein individual magnetic electrical contacts of the commonly configured interface are dynamically assigned to be power, ground, or data connections to provide a changeable or a reversible interface between modules of the smart object system.

5. The apparatus of claim 1, wherein the magnetic electrical contacts secure the multiple modules together in three dimensions to form a 3-dimensional structure of the smart object system.

6. The apparatus of claim 5, wherein the core module dynamically assigns and reassigns electrical power, electrical ground, and/or data channels to the magnetic electrical contacts between the multiple modules to configure and reconfigure a control network or a communication network between the multiple modules.

7. The apparatus of claim 1, wherein the magnetic electrical contacts are disposed on one or more edges of the multiple modules, and the multiple modules couple with each other with edge-to-edge interfaces.

8. The apparatus of claim 1, wherein the magnetic electrical contacts are disposed on one or more major faces of the multiple modules, and the multiple modules couple with each other with face-to-face interfaces.

9. The apparatus of claim 1, further comprising: a second socket attachable to a motherboard;

at least one magnet in a wall of the second socket;

magnetic electrical contacts of a module of the smart object system disposed on at least one edge of the module;

wherein the at least one magnet in the wall of the second socket releasably secures the module to the second socket via the magnetic electrical contacts on the at least one edge of the module; and wherein the at least one magnet in the wall of the second socket establishes an electrical contact with the module via the magnetic electrical contacts of the module.

10. The apparatus of claim 1, wherein the multiple modules are flat;

wherein the multiple modules stack vertically together via the commonly configured interfaces disposed on face surfaces of the multiple modules; and wherein the multiple modules expand horizontally by edge-to-edge coupling with each other via the commonly configured interfaces disposed on edges of the multiple modules.

11. A module for a smart object system, comprising:

a housing member capable of holding electronic circuitry of the smart object system;

at least one instance of an interface on at least one side of the housing member;

each interface comprising at least one magnetic electrical contact;

each magnetic electrical contact capable of physically securing the magnetic electrical contact with a complementary electrical contact on another component of the smart object system;

each magnetic electrical contact capable of electrically coupling with a complementary electrical contact on said another component of the smart object system; and a socket attachable to a motherboard;

at least one magnet in a floor of the socket;

at least one magnetic electrical contact of a module of the smart object system disposed on at least a face the module;

wherein the at least one magnet in the floor of the socket secures the module to the socket via the at least one magnetic electrical contact on the at least one face of the module; and wherein the at least one magnet in the floor of the socket establishes an electrical contact with the module via the at least one magnetic electrical contact on the at least one face of the module.

12. The module of claim 11, wherein the other component of the smart object system comprises one of another module of the smart object system having at least one instance of the interface on at least one side of the housing member of the other module, a connector for coupling the module to a motherboard, or a socket for coupling the module to the motherboard.

13. The module of claim 11, wherein the electronic circuitry of the smart object system comprises one of a sensor circuitry, a machine learning engine, connection circuitry, interconnect circuitry, or interposer circuitry.

14. The module of claim 11, wherein each interface is reversible.

15. A method, comprising:

constructing modules of a configurable smart object system, wherein at least one module comprises a machine learning engine; and constructing an interface on each of the modules, each interface including at least one magnetic electrical contact for physically and electrically coupling with another instance of the interface on another one of the modules, the interface comprising:

a socket attachable to a motherboard;

at least one magnet in a floor of the socket;

at least one magnetic electrical contact of a module of the smart object system disposed on at least a face the module;

wherein the at least one magnet in the floor of the socket secures the module to the socket via the at least one magnetic electrical contact on the at least one face of the module; and wherein the at least one magnet in the floor of the socket establishes an electrical contact with the module via the at least one magnetic electrical contact on the at least one face of the module.

16. The method of claim 15, further comprising constructing a reversible interface on each of the modules, wherein the magnetic electrical contacts make equivalent electrical and data connections in multiple connection orientations.

17. The method of claim 15, further comprising dynamically assigning power, ground, and data channels to magnetic electrical contacts of the interfaces between the modules during a configuration or a reconfiguration of the configurable smart object system.

18. The method of claim 17, further comprising extending a communication network or a control network across the modules connected through the magnetic electrical contacts.

19. The method of claim 18, further comprising dynamically reconfiguring the communication network or the control network when first magnetic electrical contacts of a first interface of a first module are attached, detached, or reattached to second magnetic electrical contacts of a second interface of a second module of the configurable smart object system.

20. A method, comprising:
securing a module of a smart object system to a board or a motherboard via one or more magnets of an interface; and
electrically coupling the module to the board or the motherboard via the one or more magnets of the interface, the interface comprising:
a socket attachable to a motherboard;
at least one magnet in a floor of the socket;
at least one magnetic electrical contact of a module of the smart object system disposed on at least a face the module;
wherein the at least one magnet in the floor of the socket secures the module to the socket via the at least one magnetic electrical contact on the at least one face of the module; and
wherein the at least one magnet in the floor of the socket establishes an electrical contact with the module via the at least one magnetic electrical contact on the at least one face of the module.

* * * * *